United States Patent
Franklin, Jr. et al.

(10) Patent No.: US 6,317,746 B1
(45) Date of Patent: *Nov. 13, 2001

(54) SOFTWARE DATE AND TIME SERVICES

(75) Inventors: Robert Wayne Franklin, Jr.; James Allen Looper; John M. Rogers; Arnold E. Tramble, all of Colorado Springs, CO (US)

(73) Assignee: MCI Communications Corporation, Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,645

(22) Filed: May 18, 1998

(51) Int. Cl.[7] ........................................ G06F 17/30
(52) U.S. Cl. ................................ 707/101; 717/4
(58) Field of Search ............... 707/8, 101, 201, 707/1; 395/704, 705; 717/4

(56) References Cited

U.S. PATENT DOCUMENTS

| | | | |
|---|---|---|---|
| 5,640,550 | * 6/1997 | Coker | 707/4 |
| 5,852,824 | * 12/1998 | Brown | 707/6 |
| 5,970,247 | * 10/1999 | Wolf | 717/4 |
| 5,978,809 | * 11/1999 | Bemer | 707/101 |
| 6,002,873 | * 12/1999 | Carter et al. | 395/705 |
| 6,003,028 | * 12/1999 | Koernig | 707/6 |

* cited by examiner

Primary Examiner—Hosain T. Alam
Assistant Examiner—Jean Bolte Fleurantin

(57) ABSTRACT

A program product performs date and time services for a calling program. The program product accepts multiple date and time inputs, multiple date and time input and output formats, and multiple function requests. A windowing function is performed to determine a century value for a date that lacks a century designator. Gregorian, Julian, ADABAS D, ADABAS T, EIBDATE, and other formats are supported. Formats may also be parameterized for individual functions allowing a calling program to select multiple and diverse formats for a sequence of called functions. Version checking and version tracking are also supported to insure the calling program interfaces with a version of the program product having an expected functionality. A method provides the functionality of the program product, receiving calls from a calling program. Another method embodies a calling program performing date and time operations by invoking a date and time services program.

26 Claims, 21 Drawing Sheets

SOFTWARE DATE AND TIME SERVICES

BACKGROUND OF THE INVENTION

1. Field of the Invention

The present invention pertains generally to electrical computers and more particularly to program products and methods for providing date and time software services to calling programs.

2. Background of the Invention

Information technology organizations throughout all industries are working to solve what is known as the "Year 2000" problem. For the past several decades, systems have typically used two digits to represent the year, such as "98" to represent "1998", in order to conserve electronic data storage and reduce operating costs. With this 2-digit format, however, the year "2000" is indistinguishable from the year "1900", the year "2001" from the year "1901", and so on. As a result of this ambiguity, application programs that perform calculations, comparisons, or sorting operations on time and date data elements may generate incorrect results when working with years after 1999.

Therefore, to avoid incorrect results, software applications must be made Year 2000 compliant by Jan. 1, 2000. To meet Year 2000 compliancy, many different approaches may be implemented. One common approach is to rewrite the source code for an application to ensure date routines can account for a 2-digit century value. However, many databases and applications are very extensive and have 2-digit year values embedded within them. Expanding such databases and modifying such applications to accommodate a 3- or 4-digit year field is impractical. A second common approach is to utilize a date/time services program that can be called by a software application during execution. Such a services program is passed a date value that comprises a 2-digit year, and returns either a value indicating a century or a date value that comprises a 3- or 4-digit year. This technique is commonly known as "windowing," and it enables a legacy software application to accommodate different century values to meet Year 2000 compliancy requirements without having to expand the underlying databases.

Beyond the single issue of Year 2000 compliancy, software applications may benefit from various date/time services. For example, during execution, an application may require a date-time translation or a date-time field format conversion. Such needs will exist well beyond the year 2000.

Currently, products on the market that offer similar services have several notable limitations. Such products only provide date services using specific and limited formats. For example, they may provide a Julian or Gregorian date to an application requiring ADABAS 'D' or 'T' format fields, which must then convert the date to a proper internal format. "ADABAS" is a database marketed by Software A.G. of Germany, and other vendors also use ADABAS formats as input and output field formats in their own database applications. In addition, such products provide services for only one date value in a single call, requiring multiple calls to the services program to obtain multiple date-time operation results. Moreover, these products do not provide combination date and time services or provide for multiple function operations. Therefore, need exists for a date and time services program that provides date and time format conversion, Year 2000 compliancy, and capabilities for handling multiple date/time inputs/outputs and multiple functions in a single call.

SUMMARY OF THE INVENTION

It is therefore an object of the present invention to provide a program product that provides date and time services to a calling program.

It is another object of the present invention to provide a program product that performs date and time operations on multiple input dates and times in a single call.

It is another object of the present invention to provide a program product that provides multiple and diverse date and time operations in a single call.

It is yet another object of the present invention to provide a program product that supports multiple input and output date and time formats and provides conversion capabilities among the formats therein.

It is yet another object of the present invention to provide a method that provides date and time services to a calling program.

It is yet another object of the present invention to provide a method that provides date and time operations on multiple input dates and times in a single call.

It is yet another object of the present invention to provide a method that provides multiple and diverse date and time operations in a single call.

It is yet another object of the present invention to provide a date and time services method that supports multiple input and output date and time formats and provides conversion capabilities among the formats therein.

It is yet another object of the present invention to provide a date and time services program accessible via a communications network.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, in accordance with the purposes of the present invention, as embodied and broadly described herein, the program product of this invention may comprise instructions for receiving a plurality of date/time input data elements via a call from a calling program; selecting one of the plurality of date/time input data elements; selecting one of a plurality of date/time output data elements associated with the selected date/time input data element; performing a date/time function on the selected date/time input data element to produce a function result; loading the function result into the selected date/time output data element; repeating the selecting steps, the performing step, and the loading step until all of the plurality of date/time input data elements have been selected; and outputting the plurality of date/time output data elements to the calling program.

The present invention may also comprise, in accordance with its objects and purposes, a method having the steps of providing a date/time services program; receiving a plurality of date/time input data elements via a call to the date/time services program; selecting one of the plurality of date/time input data elements; selecting one of a plurality of date/time output data elements associated with the selected date/time input data element; performing a date/time function on the selected date/time input data element to produce a function result; loading the function result into the selected date/time output data element; repeating the selecting steps, the performing step, and the loading step until all of the plurality of date/time input data elements have been selected; and outputting the plurality of date/time output data elements from the date/time services program.

An improved date/time services program in accordance with the present invention overcomes the disadvantages and limitations identified in the prior art. A program in accordance with the present invention is a services program, preferably in COBOL, that can be called by other software applications ("calling programs") to perform date and time services. The calling programs may include both COBOL and non-COBOL programs. The services program can perform operations on both time data elements, date data elements, and combinations thereof. Many different date and time formats can be provided and requested by the calling program, including ADABAS D and T formats, so that the calling program need not convert the input date/time data into a specific date/time format. This conversion capability simplifies the coding requirements of calling programs, because only a call to the services program is needed, whereas in prior art, for example, an additional conversion routine in the calling program would be required to obtain an ADABAS T formatted date and time result. Additionally, multiple date/time values can be included in a single call to the services program, eliminating the need for multiple calls and increasing performance of the program. Multiple function sequences, such as windowing operations performed on two dates followed by a comparison of the two dates, can also be invoked in a single call to the services routine.

BRIEF DESCRIPTIONS OF THE DRAWINGS

DETAILED DESCRIPTION OF THE INVENTION

Figure 1:
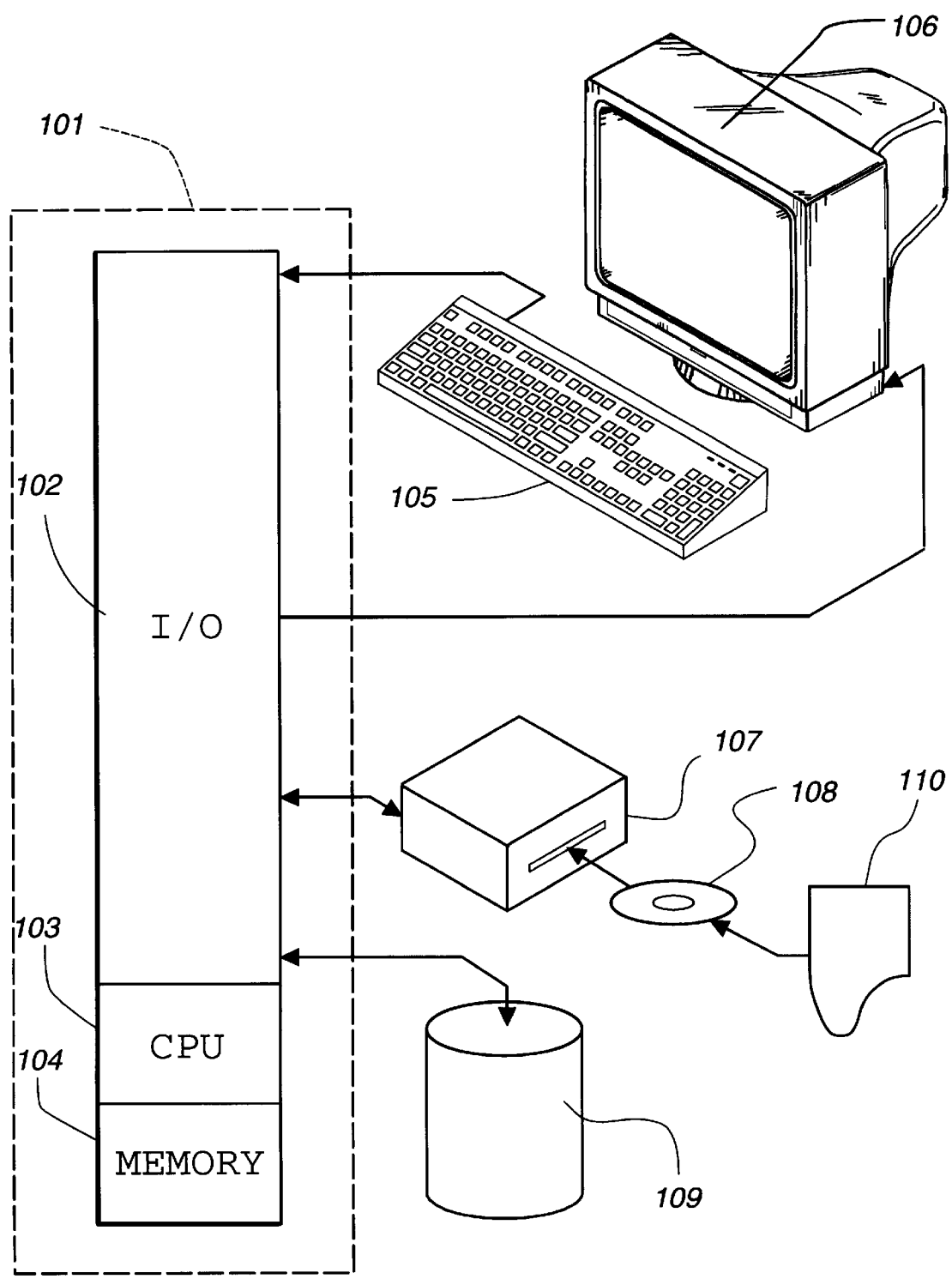
FIG. 1 depicts a general purpose computer capable of executing and storing a preferred embodiment of the present invention.

In a preferred embodiment of the present invention, a services program is a compiled COBOL program that runs on the same computer as the calling programs that access it. Another embodiment in accordance with the present invention may also run on a different computer than the calling programs that access it, being coupled by a network or other connection to a calling program computer. The computer is typically a general purpose computer, shown in FIG. 1. In such a system, data and program files may be input to the computer, which reads the files and executes the programs therein. FIG. 1 shows a processor 101 having an input/output (I/O) section 102, a Central Processing Unit (CPU) 103, and a memory section 104.

The I/O section 102 is connected to keyboard 105, display unit 106, disk storage unit 109, and disk drive unit 107. Generally, in contemporary systems, the disk drive unit 107 is a CD-ROM driver unit capable of reading a CD-ROM medium 108, which typically contains programs 110 and data. computer program products containing mechanisms to effectuate the apparatus and methods in accordance with the present invention may reside in the memory section 104, on a disk storage unit 109, or on the CD-ROM data of such a system. Alternatively, disk drive unit 107 may be replaced by a floppy drive unit, a tape drive unit, or other storage medium drive unit. Examples of such systems include mainframe systems such as MVS/ESA or OS/390 systems from IBM Corporation, minicomputer systems such as the AS/400 from IBM Corporation, SPARC systems such as those offered by Sun Microsystems, Inc., personal computers offered by IBM Corporation and by other manufacturers of IBM-compatible personal computers, and other systems running the UNIX operating system. In accordance with the present invention, date and time services software may be executed by CPU 103 and accessed by calling programs also executed by CPU 103 or by other central processing units (not shown) coupled to processor 101.

Figure 2:
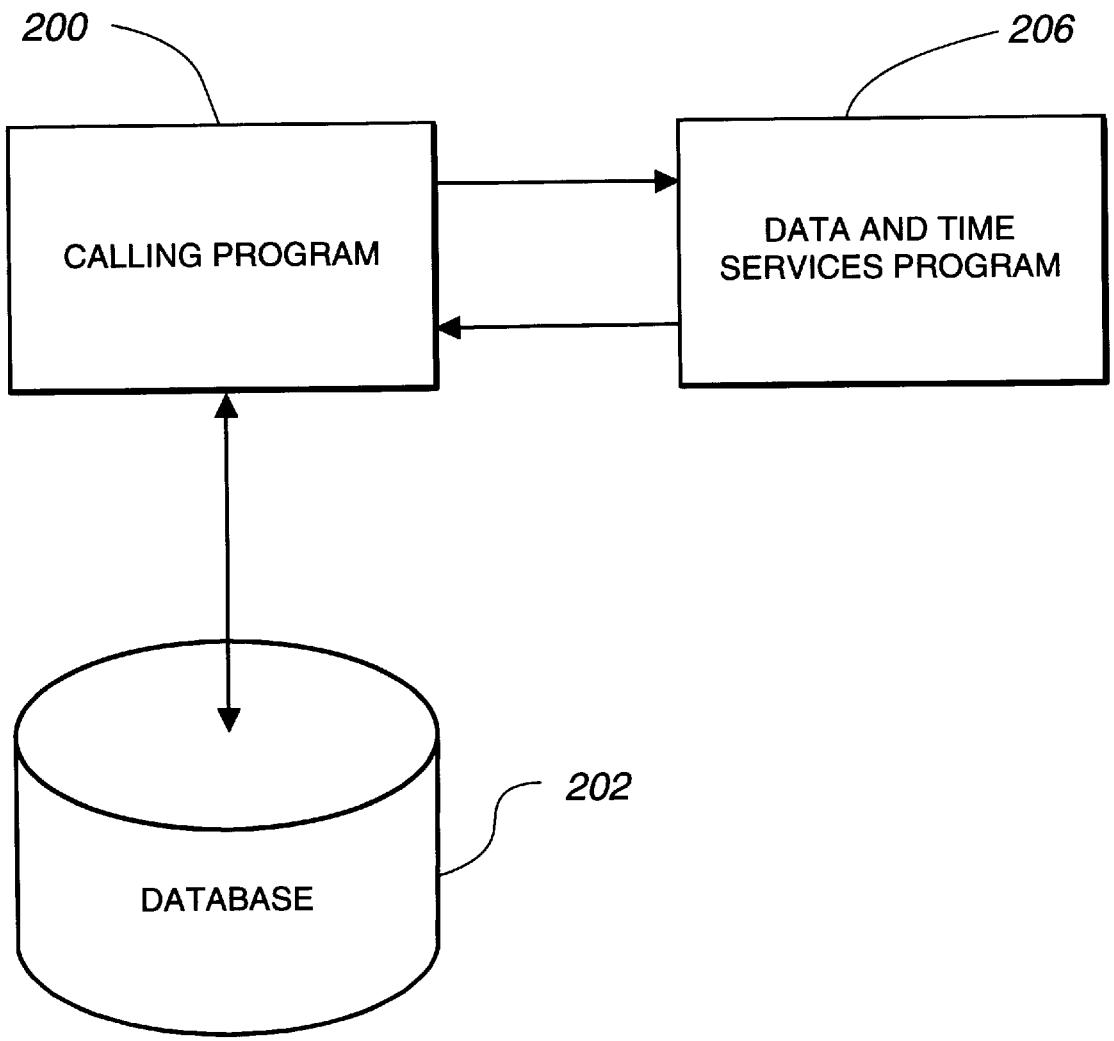
FIG. 2 depicts an architectural diagram illustrating the communications between a calling program, a database and a services program.

FIG. 2 illustrates a block diagram of an embodiment of the present invention. A calling program 200, such as an application or system program, operates on database 202, which may include multiple component databases. Calling program 200 prepares input data and issues a call to the services program block 206, which performs the date/time function specified in the input data. Other calling programs may also use the services program simultaneously because the services program is re-entrant.

Figure 3:
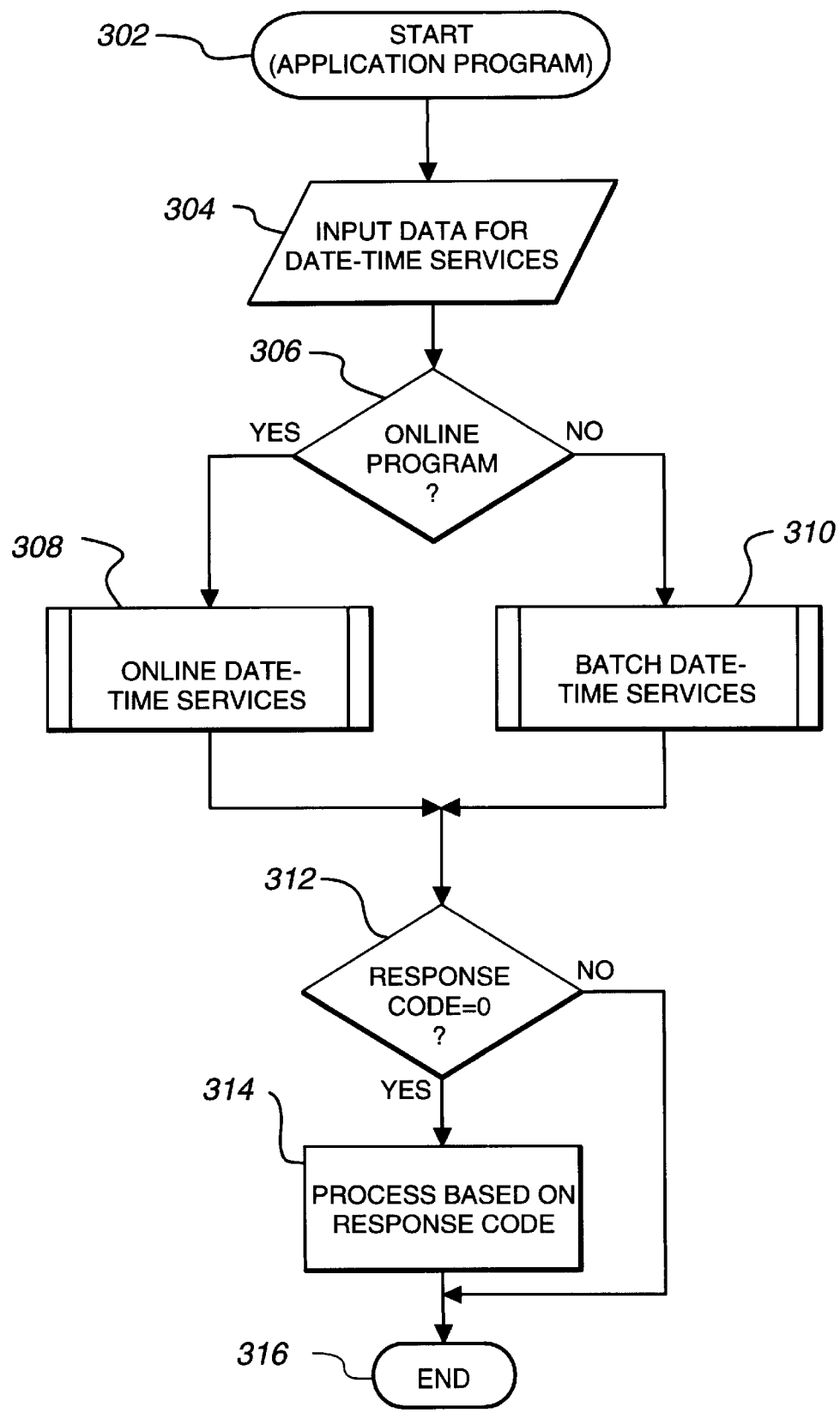
FIG. 3 depicts a flow chart describing the use of a services program by an application program.

FIG. 3 is a flow chart illustrating the process of a calling program in accordance with the present invention, which initiates at block 302. During its execution, the calling program provides input data 304 and issues a call to execute a function provided by the date/time services program. The services program may service calls from on-line calling programs or batch programs. On-line calling programs include programs running within a teleprocessing environment, such as the IBM CICS product. In a preferred embodiment of the present invention, the services program comprises two different sub-programs: one sub-program provides services for on-line calling programs, such as those executing in a CICS environment, and the other provides services for batch calling programs.

Decision block 306 decides whether the calling program is an on-line program or a batch program and executes the corresponding sub-program. If the calling program is an on-line program, the on-line services sub-program 308 executes and returns a response code and output data to the calling program. Alternatively, if the calling program is a batch program, batch services sub-program 310 executes and returns the response code and output data to the calling program. In condition block 312, if the response code returned by the services program equals zero (indicating normal processing), then the calling program continues normal processing in block 314. A non-zero response code indicates an exception condition, and in response, the calling program processes the exception condition accordingly. The application terminates at END block 316, when the application's operation completes.

Figure 4:
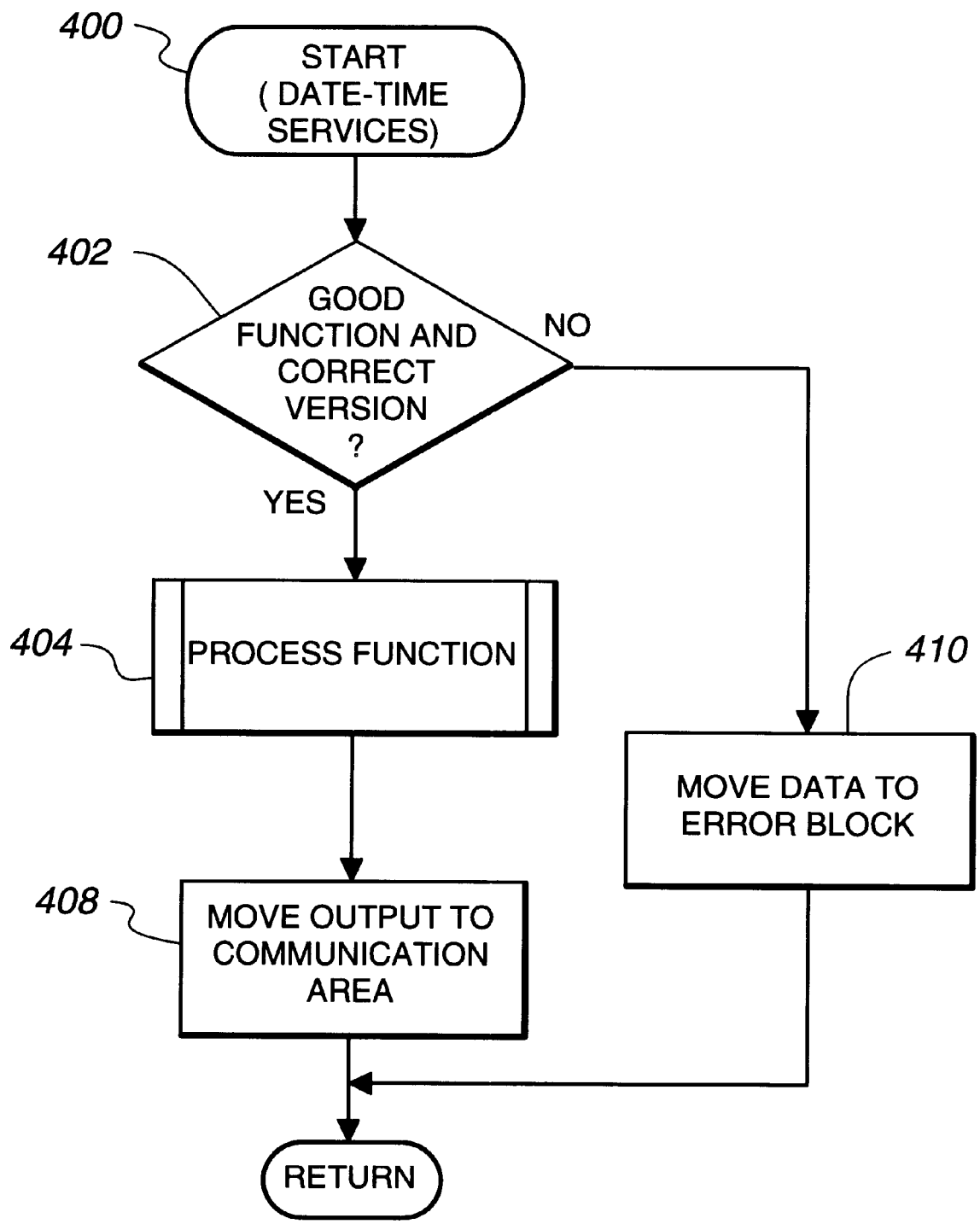
FIG. 4 depicts a flow chart describing processing within a services program.

FIG. 4 is a flowchart depicting the processing of date/time services blocks 308 and 310 from FIG. 3. When the date/time services program is invoked by a calling program, the services program commences execution at START block 400 of FIG. 4. The processing is similar for both on-line and batch services sub-programs, which are generally described hereafter as a single "services program".

The services program provides many date/time services, which are provided as functions, and the calling program inputs a specific function indicator for a desired operation. In decision block 402 of FIG. 4, the service confirms that the function indicator specified in the services program call is a valid function with a valid format. Decision block 402 also confirms that the calling program is invoking the correct version of the services program. The calling program provides a version control parameter as an input parameter, and the services program compares the version control parameter to an internal version variable representing the version of the services program.

In an alternative embodiment of the present invention, the version control parameter may be compared against a list of program version parameters. Each program version parameter in the list is associated with source code implementing the functionality of a different version of the services program. As such, if the version control parameter matches an older program version parameter, source code implementing the functionality of the older version of the services program is executed. This capability ensures that the calling program interfaces with a version of the services program for which it was developed and tested.

If either the function or the version condition in block 402 fails (i.e., produces a "NO" result), the data from the program call is moved to an error block (flowchart block 410), which is memory allocated for temporary storage of data resulting from exception processing. If condition block 402 succeeds (i.e., producing a "YES" result), the called function is processed in block 404 (as further illustrated in FIG. 5). Successful completion of block 404 produces output data that is moved in block 408 to a communication area, which is memory allocated for interprocess communications. In accordance with the present invention, the communication area may be configured to enable multiple date, time, and format values and date/time function indicators to be passed as input to and output from the services program.

The source code listing for a conversation area of a preferred embodiment of the present invention is listed below.

```
*01 (KQDTS)-DATE-TIME-SERVICES.
*-----------------------------------------------------------------------
                    (KQDTS)-DATE-TIME-SERVICE S COMMUNICATION AREA
*-----------------------------------------------------------------------
    05  (KQDTS)-BLOCK-DETAILS.
 07 (KQDTS)-PROGRAM-NAME                     PIC X(08).
            88 (KQDTS)-BLOCK-ID-CICS         VALUE 'KQDTSOP1'.
            88 (KQDTS)-BLOCK-ID-BATCH        VALUE 'KQDTSOB1'.
        07 (KQDTS)-PROGRAM-VERSION           PIC X(06).
            88 (KQDTS)-BLOCK-VERSION         VALUE 'V01.00'.
        07 (KQDTS)-PROGRAM-LINKAGE AREA      PIC 9(08).
            88 (KQDTS)-BLOCK-LENGTH          VALUE 700.
*-----------------------------------------------------------------------
                    INPUT BLOCK REQUIRED FOR THIS PROGRAM
*-----------------------------------------------------------------------
    05  (KQDTS)-IN-DATA.
        07  (KQDTS)-IN-REQ-FUNC-AREA         PIC X(08).
            88 (KQDTS)-REQ-FUNC-CURR-DT-TIM      VALUE 'CUR.100'.
            88 (KQDTS)-REQ-FUNC-CURR-DTM-D       VALUE 'CUR.101'.
            88 (KQDTS)-REQ-FUNC-CURR-DTM-T       VALUE 'CUR.102'.
            88 (KQDTS)-REQ-FUNC-CURR-DTM-D-T     VALUE 'CUR.103'.
            88 (KQDTS)-REQ-FUNC-DT-WINDOW        VALUE 'WIN.100'.
            88 (KQDTS)-REQ-FUNC-DT-WINDOW-D      VALUE 'WIN.101'.
            88 (KQDTS)-REQ-FUNC-DT-WINDOW-T      VALUE 'WIN.102'.
            88 (KQDTS)-REQ-FUNC-CALL-SQTODATE    VALUE 'TOD.100'.
            88 (KQDTS)-REQ-FUNC-CALL-SQFRDATE    VALUE 'FRD.100'.
            88 (KQDTS)-REQ-FUNC-CALL-SQTOTIME    VALUE 'TOT.100'.
            88 (KQDTS)-REQ-FUNC-CALL-SQFRTIME    VALUE 'FRT.100'.
            88 (KQDTS)-REQ-FUNC-DT-ADD-DAYS      VALUE 'ADD.100'.
            88 (KQDTS)-REQ-FUNC-DT-DIF-DAYS      VALUE 'DIF.100'.
            88 (KQDTS)-REQ-FUNC-DT-COMPR-DT      VALUE 'COM.100'.
            88 (KQDTS)-REQ-FUNC-DT-SUB-DAYS      VALUE 'SUB.100'.
            88 (KQDTS)-REQ-FUNC-DT-VALIDATE      VALUE 'VAL.100'.
            88 (KQDTS)-REQ-FUNC-DT-CONVERT       VALUE 'CON.100'.
            88 (KQDTS)-REQ-FUNC-DAY-OF-WEEK      VALUE 'DOW.100'.
            88 (KQDTS)-REQ-FUNC-DTM-VALIDAT      VALUE 'DTM.100'.
            88 (KQDTS)-REQ-FUNC-TIM-VALIDAT      VALUE 'TIM.100'.
            88 (KQDTS)-REQ-FUNC-LEAPYR-CHEK      VALUE 'LYR.100'.
            88 (KQDTS)-REQ-FUNC-DAYS-IN-MON      VALUE 'DIM.100'.
            88 (KQDTS)-REQ-FUNC-ADD-DT-TIME      VALUE 'ADT.100'.
            88 (KQDTS)-REQ-FUNC-SUB-DT-TIME      VALUE 'SDT.100'.
            88 (KQDTS)-REQ-FUNC-DIF-DT-TIME      VALUE 'DDT.100'.
```

-continued

```
07  (KQDTS)-IN-FUTURE-USE-00              PIC X(5).
07  (KQDTS)-IN-NUM-DATES PASSED           PIC 9.
    88 (KQDTS)-NUM-OF-DATES                   VALUE 1 THRU 5.
07  (KQDTS)-IN-FUTURE-USE-01              PIC X(50).
07  (KQDTS)-IN-DATE-TIME                  OCCURS 5 TIMES.
    10 (KQDTS)-IN-DATE FORMAT             PIC X(05).
       88 (KQDTS)-YYMMDD                      VALUE 'YMD    '
       88 (KQDTS)-CCYYMMDD                    VALUE 'CYMD   '
       88 (KQDTS)-ADAT                        VALUE 'ADAT   '
       88 (KQDTS)-ADAD                        VALUE 'ADAD   '
       88 (KQDTS)-YYDDD                       VALUE '5JJ    '
       88 (KQDTS)-YYMM                        VALUE 'YM     '
       88 (KQDTS)-MMDDYY                      VALUE 'MDY    '
       88 (KQDTS)-DDMMYY                      VALUE 'DMY    '
       88 (KQDTS)-YEAR                        VALUE 'YEAR   '
       88 (KQDTS)-S-YYMMDD                    VALUE 'SYMD   '
       88 (KQDTS)-S-MMDDYY                    VALUE 'SMDY   '
       88 (KQDTS)-S-DDMMYY                    VALUE 'SDMY   '
       88 (KQDTS)-MMDDCCYY                    VALUE 'MDCY   '
       88 (KQDTS)-DDMMCCYY                    VALUE 'DMCY   '
       88 (KQDTS)-S-CCYYMMDD                  VALUE 'SCYMD  '
       88 (KQDTS)-S-MMDDCCYY                  VALUE 'SMDCY  '
       88 (KQDTS)-S-DDMMCCYY                  VALUE 'SDMCY  '
       88 (KQDTS)-S-YYMM                      VALUE 'SYM    '
       88 (KQDTS)-S-YYDDD                     VALUE '55JJ   '
       88 (KQDTS)-S-CCYYDDD                   VALUE '57JJ   '
       88 (KQDTS)-S-CCYYMM                    VALUE 'SCYM   '
       88 (KQDTS)-CCYYDDD                     VALUE '7JJ    '
       88 (KQDTS)-CCYYMM                      VALUE 'CYM    '
       88 (KQDTS)-CHARACTER                   VALUE 'CHAR   '
    10 (KQDTS)-IN-DATE-TIME-RC            PIC 9(03).
    10 (KQDTS)-IN-DATE                    PIC X(20)       JUST
                                                          RIGHT
    10 (KQDTS)-IN-TIME                    PIC X(12).
    10 FILLER   REDEFINES                        (KQDTS)-IN-TIME.
       12 (KQDTS)-IN-HOUR                 PIC 9(02).
       12 (KQDTS)-IN-MIN                  PIC 9(02).
       12 (KQDTS)-IN-SEC                  PIC 9(02).
       12 (KQDTS)-IN-MILLI-SEC            PIC 9(03).
       12 (KQDTS)-IN-FUTURE-SEC           PIC 9(03).
    10 FILLER   REDEFINES                        (KQDTS)-IN-TIME.
       12 (KQDTS)-IN-HHHMMSS              PIC 9(06).
       12 FILLER                          PIC 9(06).
    10 FILLER   REDEFINES                        (KQDTS)-IN-TIME.
       12 (KQDTS)-IN-HHHMMSSTEN           PIC 9(07).
       12 FILLER                          PIC9 (05).
    10 FILLER   REDEFINES                        (KQDTS)-IN-TIME.
       12 (KQDTS)-IN-HHHMMSSHUN           PIC 9(08).
       12 FILLER                          PIC9(04).
    10 FILLER REDEFINES                          (KQDTS)-IN-TIME.
       12 (KQDTS)-IN-HHHMMSSMIL           PIC 9(09).
       12 FILLER                          PIC9(03).
07  (KQDTS)-IN-TIME-FOR-CALC              PIC 9(09).
07  FILLER   REDEFINES     (KQDTS)-IN-TIME-FOR-CALC.
    10 (KQDTS)-IN-DAYS-FOR-CALC           PIC 9(09).
07  (KQDTS)-IN-TIME-FLAG-CALC             PIC X.
    88 (KQDTS)-HR-PARM                        VALUE 'H'.
    88 (KQDTS)-MM-PARM                        VALUE 'M'.
    88 (KQDTS)-SS-PARM                        VALUE 'S'.
07  (KQDTS)-IN-FUTURE-USE-02              PIC X(40).
*---------------------------------------------------------------------
    OUTPUT BLOCK FOR THE CALLING PROGRAM
*---------------------------------------------------------------------
05  (KQDTS)-OUT-DATA.
    07 (KQDTS)-OUT-DIFFERENCE-IN-DAYS     PIC 9(05).
    07 (KQDTS)-OUT-DAYS-IN-MONTH          PIC 9(02).
       88 (KQDTS)-DIM                         VALUE 1 THRU 31.
    07 (KQDTS)-OUT-LEAP-YEAR-FLAG         PIC X.
       88 (KQDTS)-LEAP-YEAR                   VALUE 'Y'.
       88 (KQDTS) -NON-LEAP-YEAR               VALUE 'N'.
    07 (KQDTS)-OUT-VALIDATE-FLAG          PIC X.
       88 (KQDTS)-VALIDATION-PASS             VALUE 'Y'.
       88 (KQDTS)-VALIDATION-FAIL             VALUE 'N'.
    07 (KQDTS)-OUT-COMPARE-FLAG           PIC X.
       88 (KQDTS)-FIRST-DATE-GREATER          VALUE '>'.
       88 (KQDTS)-FIRST-DATE-LESSER           VALUE '<'.
       88 (KQDTS)-DATES-ARE-EQUAL             VALUE '='.
    07 (KQDTS)-OUT-DAY-OF-WEEK            PIC X.
       88 (KQDTS)-SUNDAY                      VALUE '1'.
```

-continued

```
       88 (KQDTS)-MONDAY                    VALUE '2'.
       88 (KQDTS)-TUESDAY                   VALUE '3'.
       88 (KQDTS)-WEDNESDAY                 VALUE '4'.
       88 (KQDTS)-THURSDAY                  VALUE '5.'
       88 (KQDTS)-FRIDAY                    VALUE '6'.
       88 (KQDTS)-SATURDAY                  VALUE '7'.
   07 (KQDTS)-OUT-CURRENT-ABSTIME           PIC 9(15).
   07 (KQDTS)-OUT-CURRENT-DTM.
       10 (KQDTS)-OUT-CURRENT-DATE-JUL      PIC 9(07).
       10 FILLER   REDEFINES   (KQDTS)-OUT-CURRENT-DATE-JUL.
           12 (KQDTS)-OUT-CURR-CCYY    PIC 9(04).
           12 (KQDTS)-OUT-CURR-DDD     PIC 9(03).
       10 (KQDTS)-OUT-CURRENT-DATE     PIC 9(08).
       10 FILLER   REDEFINES       (KQDTS)-OUT-CURRENT-DATE.
           12 (KQDTS)-CURRENT-CCYY     PIC 9(04).
           12 (KQDTS)-CURRENT-MM       PIC 9(02).
           12 (KQDTS)-CURRENT-DD       PIC 9(02).
       10 (KQDTS)-OUT-CURRENT-TIME     PIC 9(12).
       10 FILLER   REDEFINES           (KQDTS)-OUT-CURRENT-TIME.
       12 (KQDTS)-OUT-CURR-HR          PIC 9(02).
       12 (KQDTS)-OUT-CURR-MIN         PIC 9(02).
       12 (KQDTS)-OUT-CURR-SEC         PIC 9(02).
       12 (KQDTS)-OUT-CURR-MILLISEC    PIC 9(03).
       12 FILLER                       PIC 9(03).
       10 FILLER   REDEFINES   (KQDTS)-OUT-CURRENT-TIME.
           12 (KQDTS)-OUT-CURR-HHMMSSMIL         PIC 9(09).
           12 FILLER                             PIC 9(03).
       10 FILLER   REDEFINES   (KQDTS)-OUT-CURRENT-TIME.
           12 (KQDTS)-OUT-CURR-HHMMSSHUN         PIC 9(08).
           12 FILLER                             PIC 9(04).
       10 FILLER   REDEFINES   (KQDTS)-OUT-CURRENT-TIME.
           12 (KQDTS)-OUT-CURR-HHMMSSTEN         PIC 9(07).
           12 FILLER                             PIC 9(05).
       10 FILLER   REDEFINES       (KQDTS)-OUT-CURRENT-TIME.
           12 (KQDTS)-OUT-CURR-HHMMSS  PIC 9(06).
           12 FILLER                   PIC 9(06).
   07 (KQDTS)-OUT-FUTURE-USE-01     PIC X(65).
   07 (KQDTS)-OUT-DATE-TIME     OCCURS 5 TIMES.
       10 (KQDTS)-OUT-DATE         PIC 9(08).
       10 FILLER   REDEFINES      (KQDTS)-OUT-DATE.
           12 (KQDTS)-OUT-CCYYMMDD    PIC 9(08).
       10 FILLER   REDEFINES       (KQDTS)-OUT-DATE.
           12 (KQDTS)-OUT-CCYYMM      PIC 9(06).
           12 FILLER                  PIC 9(02).
       10 FILLER   REDEFINES      (KQDT S)-OUT-DATE.
           12 (KQDTS)-OUT-CCYY        PIC 9(04).
           12 FILLER                  PIC 9(04).
       10 FILLER   REDEFINES       (KQDTS)-OUT-DATE.
           12 FILLER                  PIC 9(01).
       12 (KQDTS)-OUT-JULIAN-CCYYDDD  PIC 9(07).
       10 (KQDTS)-OUT-TIME            PIC 9(12).
       10 FILLER   REDEFINES        (KQDTS)-OUT-TIME.
           12 (KQDTS)-OUT-HOUR        PIC 9(02).
           12 (KQDTS)-OUT-MIN         PIC 9(02).
           12 (KQDTS)-OUT-SEC         PIC 9(02).
           12 (KQDTS)-OUT-MILLISEC    PIC 9(03).
           12 (KQDTS)-OUT-FUTURE-SEC  PIC 9(03).
       10 FILLER   REDEFINES       (KQDTS)-OUT-TIME.
           12 (KQDTS)-OUT-HHMMSSMIL   PIC 9(09).
           12 FILLER                  PIC 9(03).
       10 FILLER   REDEFINES       (KQDTS)-OUT-TIME.
           12 (KQDTS)-OUT-HHMMSSHUN   PIC 9(08).
           12 FILLER                  PIC 9(04).
       10 FILLER   REDEFINES       (KQDTS)-OUT-TIME.
           12 (KQDTS)-OUT-HHMMSSTEN   PIC 9(07).
           12 FILLER                  PIC 9(05).
       10 FILLER   REDEFINES       (KQDTS)-OUT-TIME.
           12 (KQDTS)-OUT-HHMMSS      PIC 9(06).
           12 FILLER                  PIC 9(06).
       10 (KQDTS)-OUT-D-FORMAT        PIC 9(07).
       10 (KQDTS)-OUT-T-FORMAT        PIC 9(13).
   07 (KQDTS)-OUT-FUTURE-USE-02      PIC X(46).
01 (R)-INFORMATION.
   10 (R)-BLOCK-DATA.
       15 (R)-BLOCK.
           88 (R)-BLOCK-ID
                                   VALUE 'KQSEBVCCV01.00'.
           20 (R)-BLOCK-NAME         PIC X(008)
                                   VALUE 'KQSEBVCC'.
```

```
                    -continued
              88  (R)-BLOCK-NAME-ID
                              VALUE 'KQSEBVCC'.
           20 (R)-BLOCK-VER          PIC X(006)
                              VALUE 'V01.001'.
              88  (R)-BLOCK-VER-ID   VALUE 'V01.00'.
        15 (R)-BLOCK-LEN             PIC 9(008)
                              VALUE 452.
           88 (R)-BLOCK-LENGTH
                              VALUE 452.
        15 (R)-BLOCK-FILLER    PIC X(015).
    10 (R)-CD-DATA.
        15 (R)-CD-SEVERITY.
           20 (R)-CD-SEVERITY-SIGN     PIC X(001).
              88   (R)-CD-SEVERITY-PLUS
                                       VALUE '+'
              88   (R)-CD-SEVERITY-MINUS
                                       VALUE '-'
           20 (R)-CD-SEVERITY-VAL      PIC 9(002).
              88   (R)-CD-SEVERITY-NONE
                                       VALUE 0.
              88   (R)-CD-SEVERITY-INFORM
                                       VALUE 4.
              88   (R)-CD-SEVERITY-WARNING
                                       VALUE 8.
              88   (R)-CD-SEVERITY-FATAL
                                       VALUE 12.
              88   (R)-CD-SEVERITY-MAJOR
                                       VALUE 16.
        15 (R)-CD-RESPONSE.
           20 (R)-CD-RESPONSE-SIGN     PIC X(001).
              88   (R)-CD-RESPONSE-PLUS
                                       VALUE '+' '
              88   (R)-CD-RESPONSE-MINUS
                                       VALUE '-'
           20 (R)-CD-RESPONSE-VAL      PIC 9(008).
        15 (R)-CD-SUPP.
           20 (R)-CD-SUPP-SIGN         PIC X(001).
              88   (R)-CD-SUPP-PLUS
                                       VALUE '+' '
              88   (R)-CD-SUPP-MINUS
                                       VALUE '-'
           20 (R)-CD-SUPP-VAL          PIC 9(008).
        15 (R)-CD-FILLER               PIC X(015).
```

The first data element group in the source code listing, (KQDTS)-BLOCK-DETAILS, defines the name of the program, the version of the program, and the size of the data block. In this listing, the program name for the services sub-program that processes calls for an on-line calling program is "KQDTSOP1". Likewise, the name for the services sub-program that processes calls from a batch calling program is called "KQDTSOB1". The program version indicated in a program version parameter as "V01.00".

The second data element group included in the source code listing, (KQDTS)-IN-DATA, includes the data descriptors for input data to the services program. Conditional data element (KQDTS)-IN-REQ-FUNC-AREA represents an 8-character field specifying the individual service function called by the calling program. (KQDTS)-IN-REC-FUNC-AREA is a conditional variable, and the twenty-five lines following this element specify condition-names corresponding to various supported service functions. Accordingly, if the value associated with (KQDTS)-IN-REQ-FUNC-AREA matches the value (e.g. CUR.100) corresponding to a condition-name, a path of execution associated with the matched condition-name is executed by the object program. Data element (KQDTS)-IN-FUTURE-USE-00 represents an additional block of memory allocated in the input block that may be utilized for future enhancements.

Conditional data element (KQDTS)-IN-NUM-DATES-PASSED contains a single-digit value ranging from 1 to 5, as specified by the condition-name (KQDTS)-NUM-OF-DATES, and specifies the number of dates passed to the services program for processing by a WINDOWING function (e.g., "WIN.100") and other functions. Data element (KQDTS)-IN-FUTURE-USE-01 represents a block of memory allocated in the input block that may be utilized for future enhancements.

Group data element (KQDTS)-IN-DATE-TIME represents a subgroup within the (KQDTS)-IN-DATA data group. (KQDTS)-IN-DATE-TIME defines a fixed-length table of five date/time data elements. Each date/time-related element includes four data elements: (KQDTS)-IN-DATE-FORMAT, (KQDTS)-IN-DATE-TIME-REC, (KQDTS)-IN-DATE, and (KQDTS)-IN-TIME. Conditional data element (KQDTS)-IN-DATE-FORMAT is a 5-character field that specifies the one of the 24 formats (listed in the subsequent condition-name statements) in which the input date can be passed to the -services program. In addition, the number and character of supported formats are not limited to the 24 formats shown but can be modified to support any desired set of formats.

Data element (KQDTS)-IN-DATE-TIME-RC is a 3-digit field that holds the return code associated with an input date. In a preferred embodiment of the present invention, (KQDTS)-IN-DATE-TIME-RC is used in conjunction with COM.100, DIF.100, WIN.100, WIN.101, and WIN.102. In a different embodiment, it may be desirable to employ return codes for additional functions, and this variable may be used for that purpose. Conditional data element (KQDTS)-IN-DATE is a 20-character field that holds the input date, provided by the calling program, on which the services program is to perform its operation. For all services program functions, if the input date lacks a century designator, the function performs a WINDOWING function using a pivot year to determine an appropriate century value. Data element (KQDTS)-IN-TIME is a 12-character field that holds the input time, provided by the calling program, on which the services program is to perform its operation. The "REDEFINES" statements that follow the initial data description entry for the (KQDTS)-IN-TIME data element provide alternative data description entries for the (KQDTS)-IN-TIME data element.

Data element (KQDTS)-IN-TIME-FOR-CALC contains a 9-digit numeric value passed by the application program to add a certain amount of time to or to subtract a certain amount of time from a given input date-time data element when executing ADD or SUB date/time services. In a preferred embodiment, the data element is also redefined as (KQDTS)-IN-DAYS-FOR-CALC to represent a certain number of days to be added to or subtracted from the input date/time value. Data element (KQDTS)-IN-FUTURE-USE-02 represents an additional block of memory allocated in the input block that may be utilized for future enhancements.

In the output block included in the source code listing, (KQDTS)-OUT-DATA defines a group element containing output data elements and groups. Data element (KQDTS)-OUT-DIFFERENCE-IN-DAYS is a 5-digit field that stores the difference (in number of days) between two input dates passed by the application program. This data element is populated by the services program only a DIFFERENCE function (e.g., "DIF.100"), which requires two input dates and/or times, is used.

Conditional data element (KQDTS)-OUT-DAYS-IN-MONTH is a 2-digit field that stores the number of days in the month associated with the input date received from the calling program. For example, if a calling program passes a date representing Oct. 28, 1995, the services program will populate the (KQDTS)-OUT-DAYS-IN-MONTH field with the number "31". Condition name (KQDTS)-DIM specifies the condition that the (KQDTS)-OUT-DAYS-IN-MONTH data element be a number between 1 and 31.

Conditional data element (KQDTS)-OUT-LEAP-YEAR-FLAG is a flag value passed to the calling program to indicate whether the input date passed to the service program was a leap year. The condition names following the (KQDTS)-OUT-LEAP-YEAR-FLAG statement specify the expected values for (KQDTS)-OUT-LEAP-YEAR-FLAG. Conditional data element (KQDTS)-OUT-VALIDATE-FLAG is a flag passed to the calling program indicating whether the input date or input time passed to the VALIDATION function (i.e., "VAL.100") in the service program was valid. Other functions that perform validations also get this flag as appropriate. In addition, the two condition names that follow the (KQDTS)-OUT-VALIDATE-FLAG statement define expected values for the (KQDTS)-OUT-VALIDATE-FLAG data element. Conditional data element (KQDTS)-OUT-COMPARE-FLAG is a flag value passed to the calling program indicating one of three conditions (specified in the subsequent source code lines). This flag is set at the completion of a COMPARE (i.e., "COM.100") function, which require two input dates. If the first input date is greater than the second input date, then the (KQDTS)-FIRST-DATE-GREATER condition is met, and the (KQDTS)-OUT-COMPARE-FLAG data element equals '>'.

If the first input date is less than the second input date, then the (KQDTS)-FIRST-DATE-LESSER condition is satisfied, and the (KQDTS)-OUT-COMPARE-FLAG equals '<'. When both input dates are equal, then condition (KQDTS)-DATES-ARE-EQUAL is satisfied and (KQDTS)-OUT-COMPARE-FLAG equals '='.

Conditional data element (KQDTS)-OUT-DAY-OF-WEEK is a flag value generated by a "DAY OF WEEK" function (i.e., "DOW.100") and passed to the application program indicating the day of the week of the input date, where, as specified by the subsequent condition statements, '1' represents Sunday, '2' represents Monday, and so on. The input date passed to the service program, in a preferred embodiment of the present invention, must be a full Gregorian or Julian date. Furthermore, the (KQDTS)-OUT-DAY-OF-WEEK data element uses '1900' as the base year, so the date passed to the service program must be greater than '1900' to produce valid results. In other embodiments, any alternative base year or input date format may be supported. Data element (KQDTS)-OUT-CURRENT-ABSTIME is a 15-digit field containing a CICS ASKTIME value. The service program populates this data element when invoked by an online calling program, such as a program executed in the CICS environment.

Group element (KQDTS)-OUT-CURRENT-DTM includes the following three data elements: (KQDTS)-OUT-CURRENT-DATE, (KQDTS)-OUT-CURRENT-TIME and (KQDTS)-OUT-CURRENT-DATE-JUL. As suggested by their labels, these data elements contain the current date in Gregorian format, the current time, and the current date in Julian format, respectively. The "current" date and time are defined as the date and time of returned by CICS ASKTIME for online calling programs or ACCEPT for batch calling programs. Each data element within (KQDTS)-OUT-CURRENT-DTM is associated with one or more data descriptions, as shown in the source code listing. The "REDEFINES" statements that follow the initial data description entry for the data elements in the (KQDTS)-CURRENT-DTM group provide alternative data description entries for the data elements. Data element (KQDTS)-OUT-FUTURE-USE-01 specifies allocated memory in the output block that may be utilized for future enhancements.

Group data element (KQDTS)-OUT-DATE-TIME represents a subgroup within the (KQDTS)-OUT-DATA data group and defines a fixed-length table of five data/time output data elements. Each date/time data element includes four data elements: (KQDTS)-OUT DATE, (KQDTS)-OUT-TIME, (KQDTS)-OUT-D-FORMAT, and (KQDTS)-OUT-T-FORMAT. Conditional data element (KQDTS)-OUT-DATE is an 8-character field that specifies the result of the operation performed by the services program. If an input date in Gregorian format is passed to the services program, the corresponding (KQDTS)-OUT-DATE FORMAT is also a Gregorian format. Likewise, if the input date is in Julian format, the output date is also in Julian format. These corresponding formats are described by the "REDEFINES" statements that follow the data element statement.

Data element (KQDTS)-OUT-TIME is a 12-digit field that holds that output time resulting from the operation of the services program. The various formats supported by this data element are described in the subsequent "REDEFINES" statements that follow the (KQDTS)-OUT-TIME data element statement. Data element (KQDTS)-OUT-D-FORMAT is a 7-digit field that holds the ADABAS D formatted date corresponding to the output date. In a preferred embodiment of the present invention, the date received through this field is a 9(7) field and not a Packed-Decimal field. Data element (KQDTS)-OUT-T-FORMAT is a 13-digit field that holds the ADABAS T-formatted date or time that results from the operation performed by the services program. In a preferred embodiment of the present invention, the date time received through this field is a 9(13) field and not a Packed-Decimal field. Data element (KQDTS)-OUT-FUTURE-USE-02 represents an additional block of memory allocated in the output block that may be utilized for future enhancements. The (R)-INFORMATION data block defines the error block, which is filled with data indicating the circumstances of an exception.

Although not shown in listed source code, an alternative embodiment in accordance with the present invention includes the (KQDTS)-IN-REQ-FUNC-AREA data element in the (KQDTS)-DATE-TIME data group to allow the submission of multiple input/dates and multiple functions. In this manner, multiple and diverse functions on multiple date-time input data elements may be performed in a single call to the services program, enhancing performance of the calling program. Likewise, a date/time output format data element may be added to the (KQDTS)-IN-DATE-TIME data table to indicate the desired output format of the date/time operation's result. In this manner, a calling program may invoke a single function and select an output format from the set of supported output formats (e.g., Gregorian, Julian, ADABAS D, ADABAS T). For example, a Gregorian data can be input to a SUB.100. The calling program can specify an output date format of Julian, and the SUB.100 function will convert the SUB result into a Julian data format when it outputs the result to the calling program.

Figure 5A:
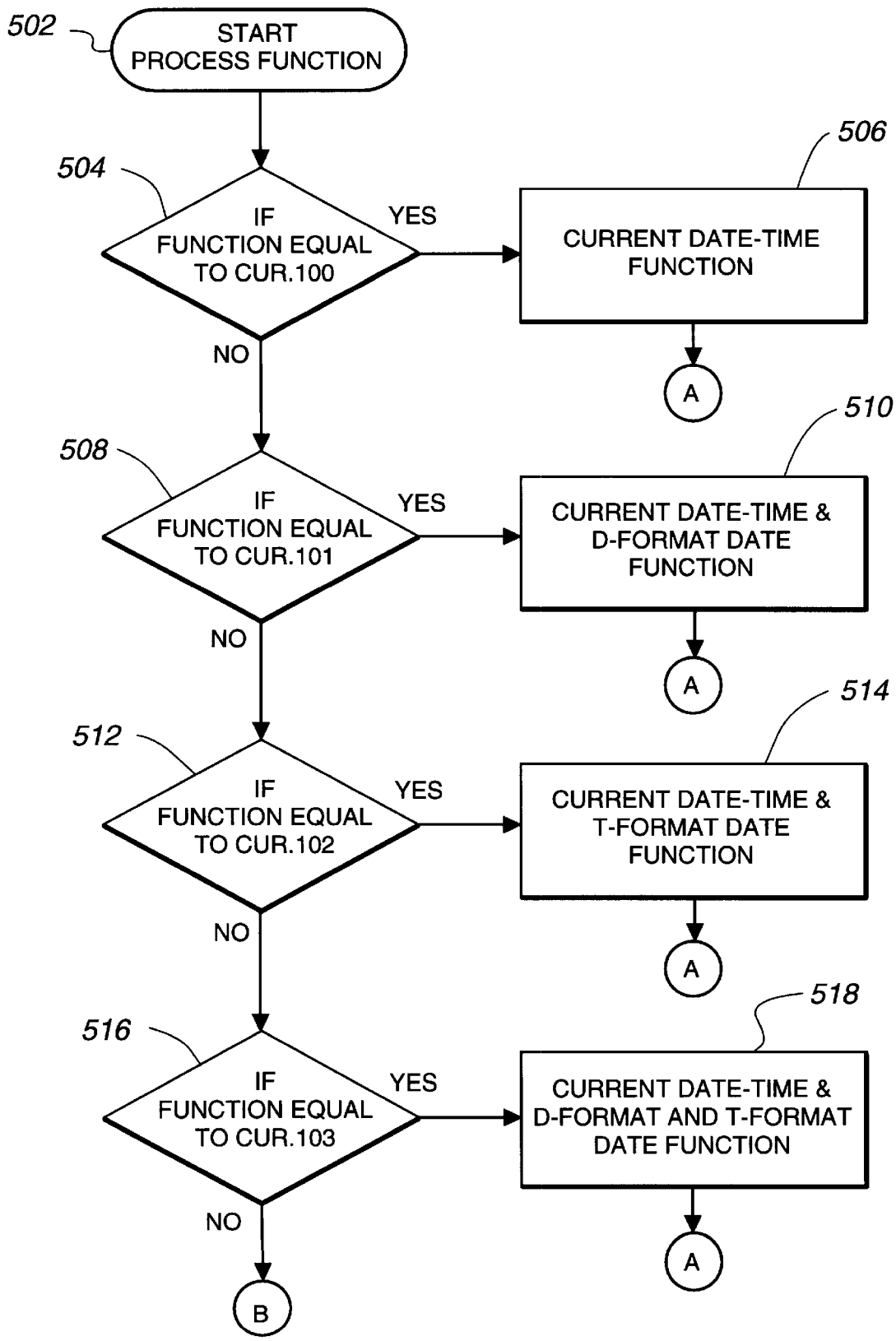
FIGS. 5A, 5B, 5C, 5D, 5E and 5F depict a flow chart of the process function shown in block 404 of FIG. 4.
Figure 5B:
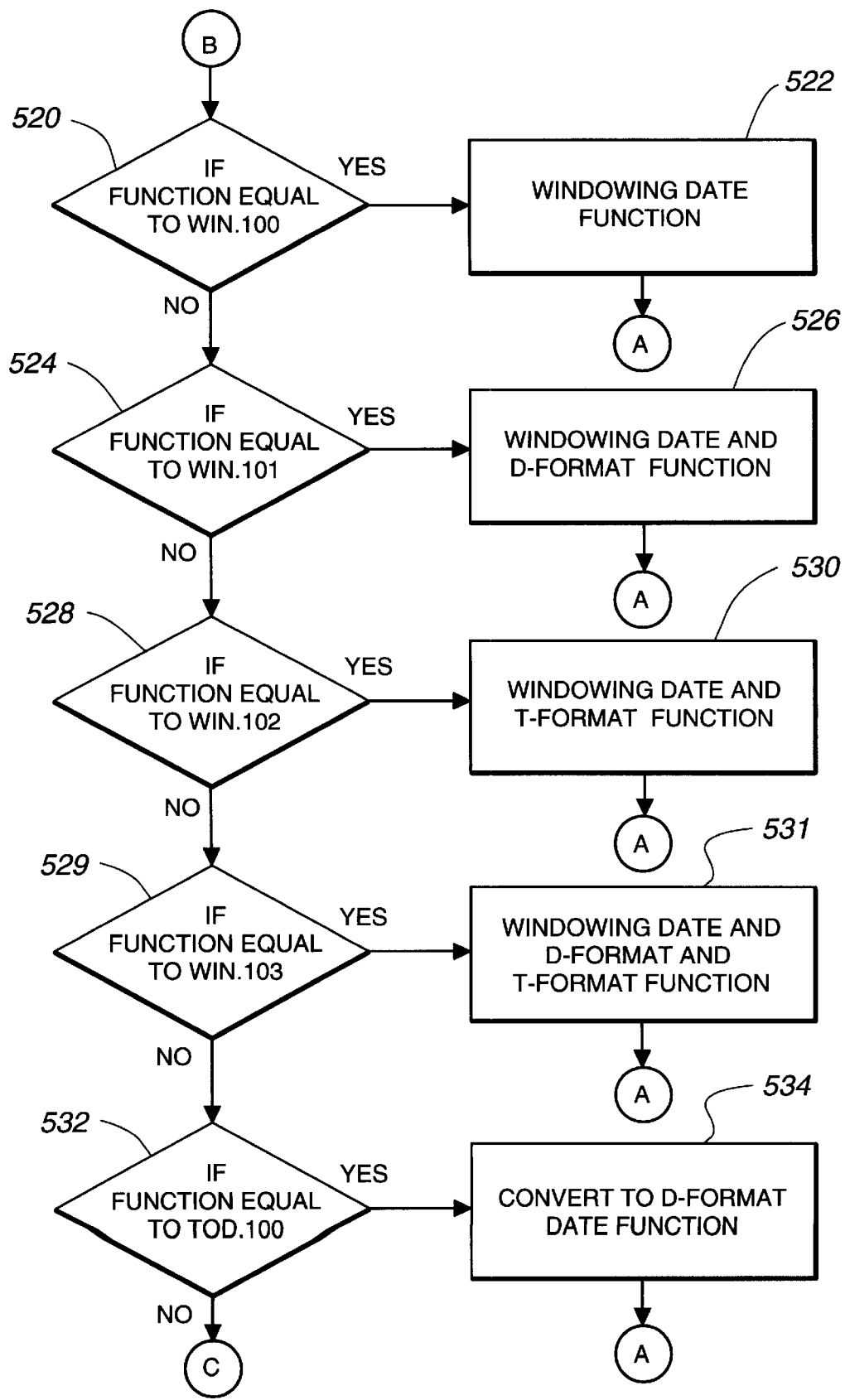
Figure 5C:
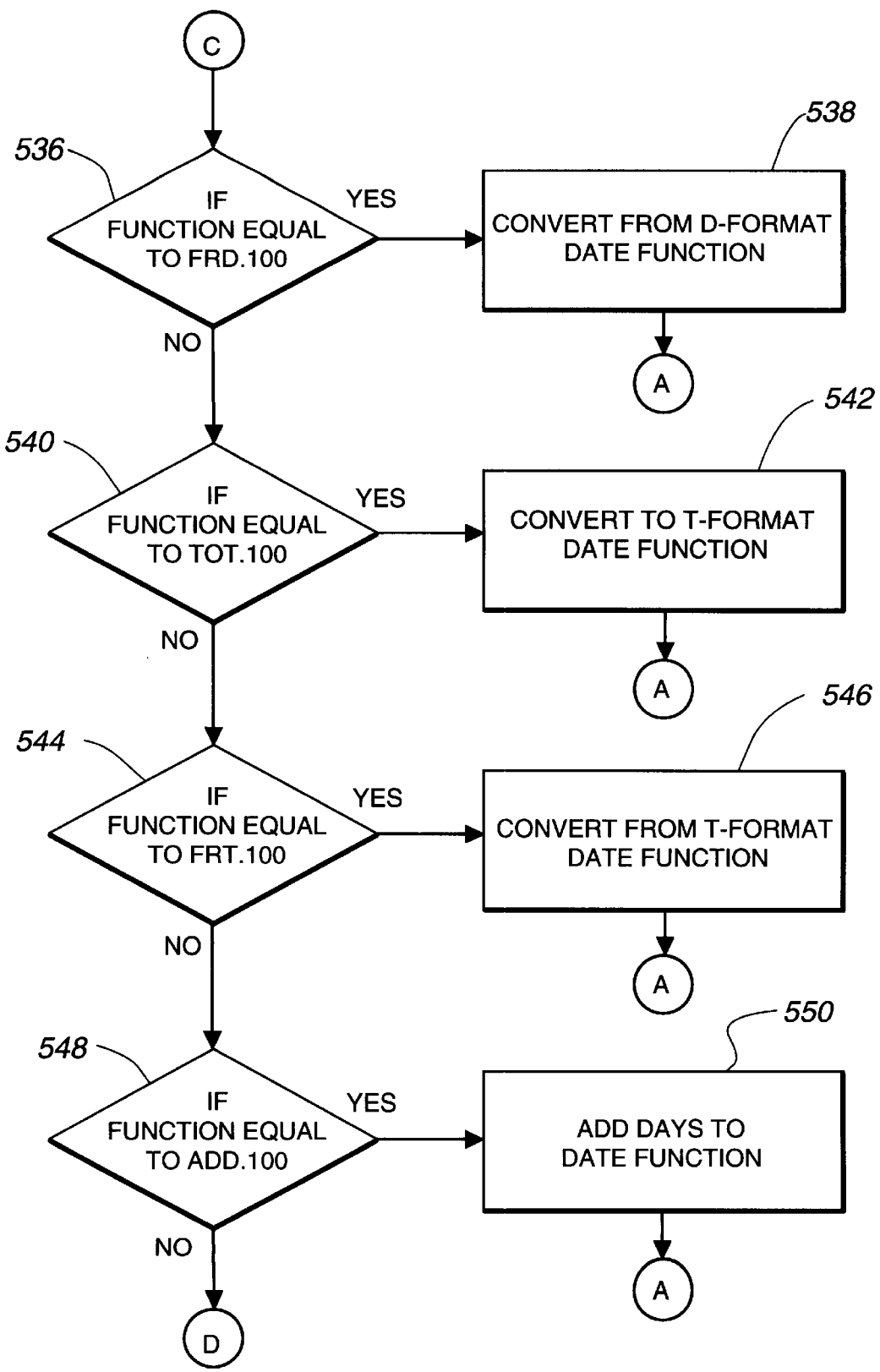
Figure 5D:
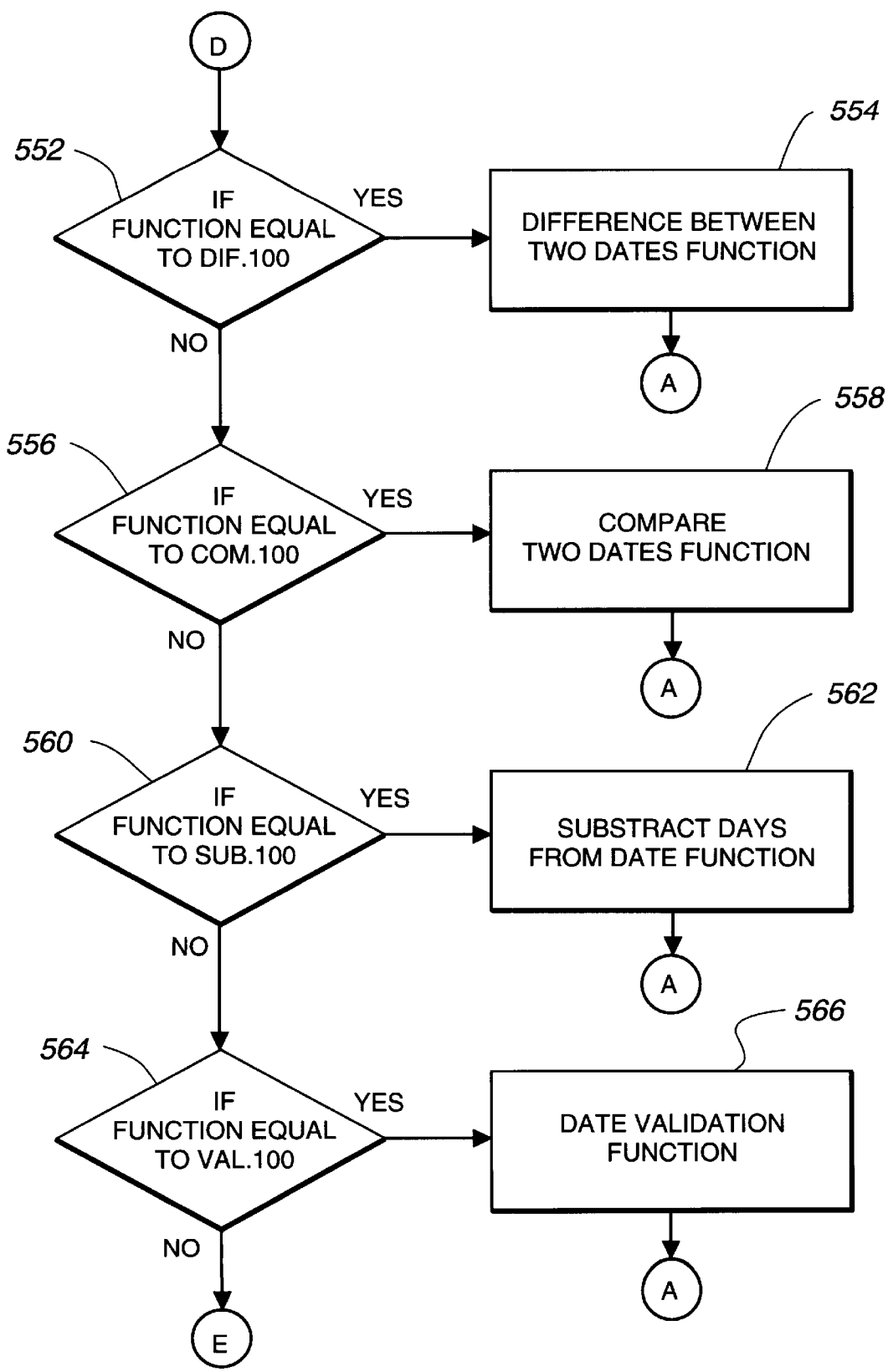
Figure 5E:
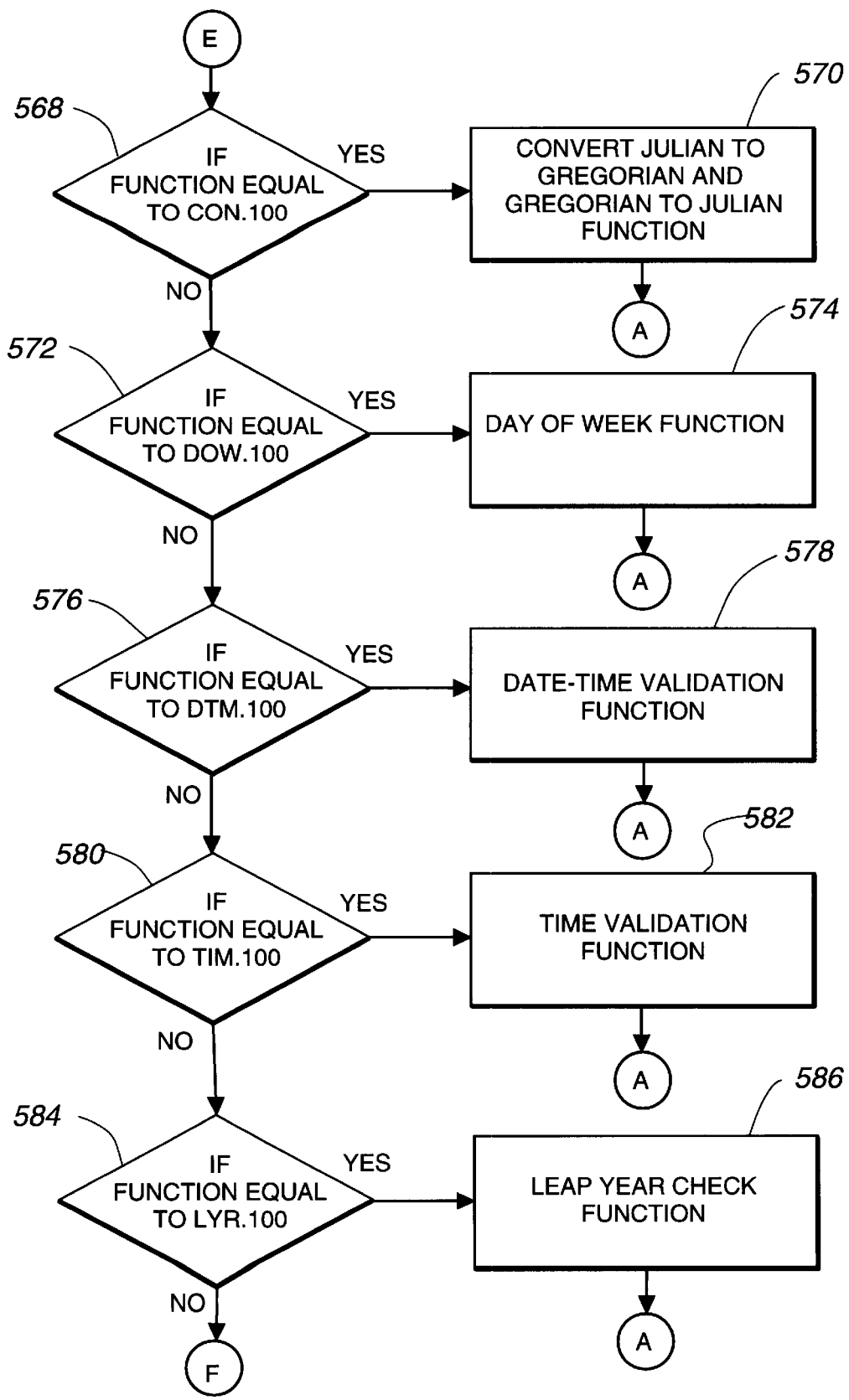
Figure 5F:
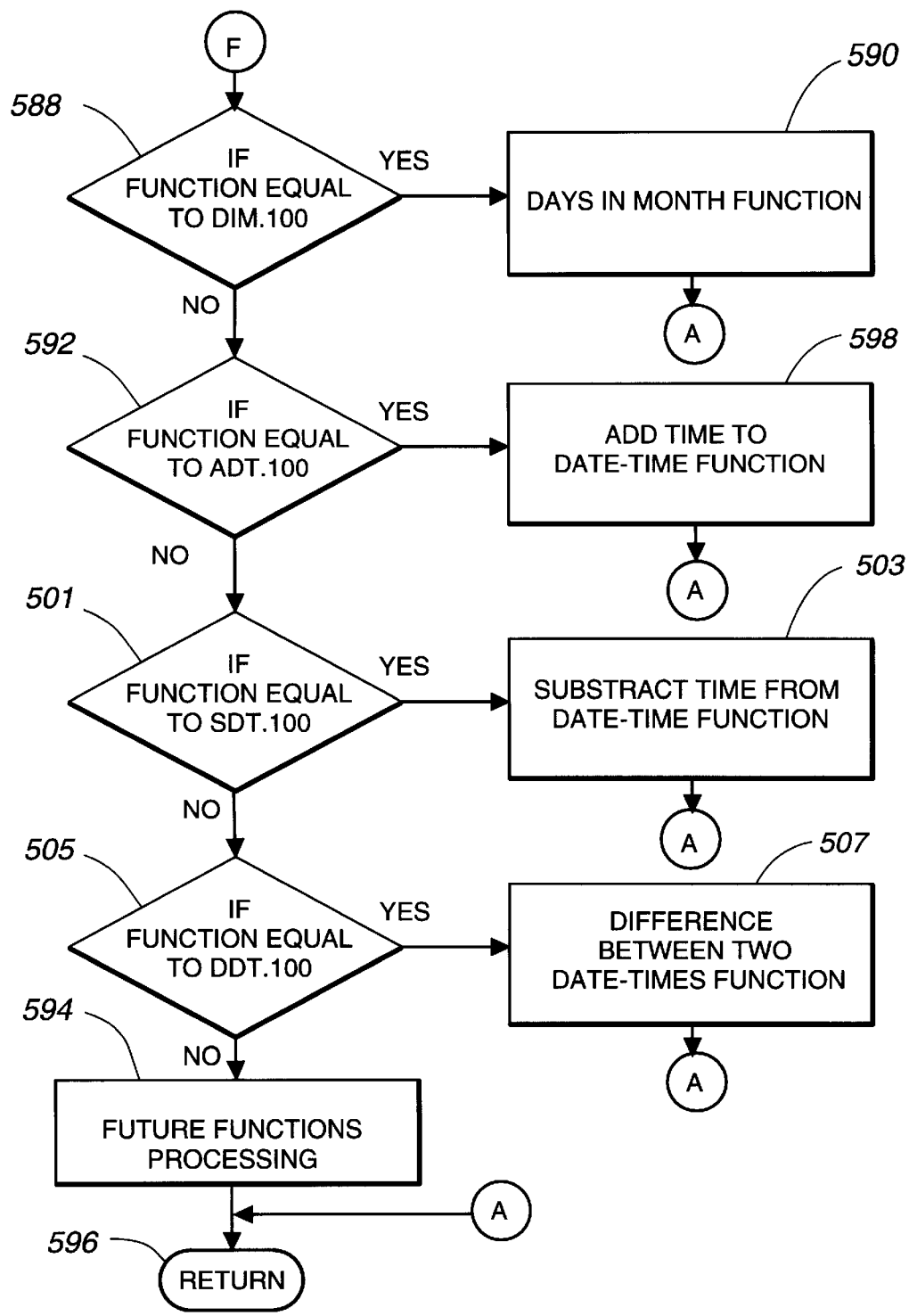

In FIG. 5A, PROCESS FUNCTION block 404 of FIG. 4 is depicted in a flowchart, starting at block 502. The services program then proceeds to decision block 504, which determines whether the function identifier loaded in the (KQDTS)-IN-REQ-FUNC-AREA data element corresponds to the CURRENT DATE-TIME function ("CUR.100"). If so, the services program proceeds to block 506, which implements the CURRENT DATE-TIME function and returns the current date-time. The current date-time is obtained either by CICS ASKTIME for online calling programs or by COBOL ACCEPT for batch calling programs. The current date and time are output in the following data elements: (KQDTS)-OUT-CURRENT-DATE, (KQDTS)-OUT-CURRENT-TIME and (KQDTS)-OUT-CURRENT-DATE-JUL. Furthermore, if the calling program is an online program, the CICS ASKTIME value is output in (KQDTS)-OUT-CURRENT-ABSTIME.

If the condition in decision block 504 is not met, the services program proceeds to decision block 508 to determine whether the requested function corresponds to CURRENT DATE-TIME & D-FORMAT DATE function in block 510. The CURRENT DATE-TIME & D-FORMAT DATE function ("CUR.101") returns the current date and time returned by CICS ASKTIME for online calling programs or by COBOL ACCEPT for batch calling programs. The current date and time are output in the following data elements: (KQDTS)-OUT-CURRENT-DATE, (KQDTS)-OUT-CURRENT-TIME and (KQDTS)-OUT-CURRENT-DATE-JUL. The current date value is also output in ADABAS D format in (KQDTS)-OUT-D-FORMAT. Furthermore, if the calling program is an online program, the CICS ASKTIME value is output in (KQDTS)-OUT-CURRENT-ABSTIME.

If the condition in decision block 508 is not met, the services program proceeds to decision block 512 to determine whether the requested function corresponds to CURRENT DATE-TIME & T-FORMAT DATE function in block 514. The CURRENT DATE-TIME & T-FORMAT DATE function ("CUR.102") returns the current date and time returned by CICS ASKTIME for online calling programs or by COBOL ACCEPT for batch calling programs. The current date and time are output in the following data elements: (KQDTS)-OUT-CURRENT-DATE, (KQDTS)-OUT-CURRENT-TIME and (KQDTS)-OUT-CURRENT-DATE-JUL. The current date/time value is also output in ADABAS T format in (KQDTS)-OUT-T-FORMAT. Furthermore, if the calling program is an online program, the CICS ASKTIME value is output in (KQDTS)-OUT-CURRENT-ABSTIME.

If the condition in decision block 512 is not met, the services program proceeds to decision block 516 to determine whether the requested function corresponds to CURRENT DATE-TIME & D-FORMAT AND T-FORMAT DATE function in block 518. The CURRENT DATE-TIME & D-FORMAT AND T-FORMAT DATE function ("CUR.103") returns the current date and time returned by CICS ASKTIME for online calling programs or by COBOL ACCEPT for batch calling programs. The current date and time are output in the following data elements: (KQDTS)-OUT-CURRENT-DATE, (KQDTS)-OUT-CURRENT-TIME and (KQDTS)-OUT-CURRENT-DATE-JUL. The current date/time value is also output in ADABAS D format in (KQDTS)-OUT-D-FORMAT and ADABAS T format in (KQDTS)-OUT-T-FORMAT. Furthermore, if the calling program is an online program, the CICS ASKTIME value is output in (KQDTS)-OUT-CURRENT-ABSTIME.

If the condition in decision block 516 is not met, the services program proceeds to decision block 520 to determine whether the requested function corresponds to WINDOWING DATE function in block 522. The WINDOWING DATE function ("WIN.100") returns a date with a century designation based on a calculation using a pivot year (as described in FIGS. 8 through 11). The date is returned in Gregorian or Julian format. In a preferred embodiment, the function operates on up to five input dates, although an alternative embodiment could process any number of input dates in a single call to the WINDOWING DATE function.

If the condition in decision block 520 is not met, the services program proceeds to decision block 524 to determine whether the requested function corresponds to WINDOWING DATE AND D-FORMAT function in block 526. The WINDOWING DATE AND D-FORMAT function ("WIN.101") returns a date with a century designation based on a calculation using a pivot year (as described in FIGS. 8 through 11). The date is returned in Gregorian or Julian format as well as ADABAS D format. In a preferred embodiment, the function operates on up to five input dates, although an alternative embodiment could process any number of input dates in a single call to the WINDOWING DATE AND D-FORMAT function.

If the condition in decision block 524 is not met, the services program proceeds to decision block 528 to determine whether the requested function corresponds to WINDOWING DATE AND T-FORMAT function in block 530. The WINDOWING DATE AND T-FORMAT function ("WIN.102") returns a date with a century designation based on a calculation using a pivot year (as described in FIGS. 8 through 11). The date is returned in Gregorian or Julian format as well as ADABAS T format. In a preferred embodiment, the function operates on up to five input dates, although an alternative embodiment could process any number of input dates in a single call to the WINDOWING DATE AND T-FORMAT function.

If the condition in decision block 528 is not met the services program proceeds to decision block 529 to determine whether the requested function corresponds to WINDOWING DATE AND D-FORMAT AND T-FORMAT function in block 531. The WINDOWING DATE AND D-FORMAT AND T-FORMAT function ("WIN.103") returns a date with a century designation based on a calculation using a pivot year (as described in FIGS. 8 through 11). The date is returned in Gregorian or Julian format as well as ADABAS D and ADABAS T formats. In a preferred embodiment, the function operates on up to five input dates, although an alternative embodiment could process any number of input dates in a single call to the WINDOWING DATE AND D-FORMAT AND T-FORMAT function.

If the condition in decision block 529 is not met, the services program proceeds to decision block 532 to determine whether the requested function corresponds to CONVERT TO D-FORMAT DATE function in block 534. The CONVERT TO D-FORMAT DATE function ("TOD.100") converts an input date from a Gregorian or Julian format into ADABAS D format. In a preferred embodiment, the function operates on up to five input dates, although an alternative embodiment could process any number of input dates in a single call to the CONVERT TO D-FORMAT DATE function.

If the condition in decision block 532 is not met, the services program proceeds to decision block 536 to determine whether the requested function corresponds to CONVERT FROM D-FORMAT DATE function in block 538. The CONVERT FROM D-FORMAT DATE function ("FRD.100") converts an input date from ADABAS D format to a Gregorian format. In a preferred embodiment, the function operates on up to five input dates, although an alternative embodiment could process any number of input dates in a single call to the CONVERT FROM D-FORMAT DATE function.

If the condition in decision block 536 is not met, the services program proceeds to decision block 540 to determine whether the requested function corresponds to CONVERT TO T-FORMAT DATE function in block 542. The CONVERT TO T-FORMAT DATE function ("TOT.100") converts an input date-time value having a Gregorian or Julian date format and an HHMMSS time format into ADABAS T format. In a preferred embodiment, the function operates on up to five input date/time values, although an alternative embodiment could process any number of input dates in a single call to the CONVERT TO T-FORMAT DATE function.

If the condition in decision block 540 is not met, the services program proceeds to decision block 544 to determine whether the requested function corresponds to CONVERT FROM T-FORMAT DATE function in block 546. The CONVERT FROM T-FORMAT DATE function ("FRT.100") converts an input date from ADABAS T format to a value having a Gregorian date format and an HHMMSS time format. In a preferred embodiment, the function operates on up to five input date/time values, although an alternative embodiment could process any number of input dates in a single call to the CONVERT FROM T-FORMAT DATE function.

If the condition in decision block 544 is not met, the services program proceeds to decision block 548 to determine whether the requested function corresponds to ADD DAYS TO DATE function in block 550. The ADD DAYS TO DATE function ("ADD.100") adds the number of days passed to the services program in (KQDTS)-IN-DAYS-FOR-CALC to the input date passed in (KQDTS)-IN-DATE, which is in Gregorian or Julian format. The resulting (KQDTS)-OUT-DATE is also in Gregorian or Julian format, corresponding with the input date format.

If the condition in decision block 548 is not met, the services program proceeds to decision block 552 to determine whether the requested function corresponds to DIFFERENCE BETWEEN TWO DATES function in block 554. The DIFFERENCE BETWEEN TWO DATES function ("DIF.100") calculates the difference between the first two input dates passed to the services program in the (KQDTS)-IN-DATE-TIME table, which are in Gregorian or Julian format. The resulting (KQDTS)-OUT-DIFFERENCE-IN-DAYS is a positive integer.

If the condition in decision block 552 is not met, the services program proceeds to decision block 556 to determine whether the requested function corresponds to COMPARE TWO DATES function in block 558. The COMPARE TWO DATES function ("COM.100") compares the first two input dates passed to the services program in the (KQDTS)-IN-DATE table, which are in Gregorian or Julian format. The resulting (KQDTS)-COMPARE FLAG has the following possible value: '<', '>', and '=', and the (KQDTS).OUT_DATE contains the greater of the two dates in Gregorian or Julian format (or the common date if the dates are equal).

If the condition in decision block 556 is not met, the services program proceeds to decision block 560 to determine whether the requested function corresponds to SUBTRACT DAYS FROM DATE function in block 562. The SUBTRACT DAYS FROM DATE function ("SUB.100") subtracts the number of days passed to the services program in (KQDTS)-IN-DAYS-FOR-CALC from the input date passed in (KQDTS)-IN-DATE, which is in Gregorian or Julian format. The resulting (KQDTS)-OUT-DATE is also in Gregorian or Julian format, according to the input date format.

If the condition in decision block 560 is not met, the services program proceeds to decision block 564 to determine whether the requested function corresponds to DATE VALIDATION function in block 566. The DATE VALIDATION function ("VAL.100") determines whether an input date in Gregorian format is a valid value by verifying that the "month" field is between 1 and 12 and that the "day" field is between 1 and 28, 29, 30, or 31, according to the appropriate month. Alternatively, if the input date is in Julian format, the DATE VALIDATION function determines whether the "day" field is between 1 and 365/366, based on a leap year check. If the input date is determined to be invalid, the (KQDTS)-OUT-VALIDATE-FLAG is set to 'N' and the response code is set to a non-zero value. Otherwise, the date is determined to be valid, the KQDTS)-OUT-VALIDATE-FLAG is set to 'Y', and the response code is set to zero.

If the condition in decision block 564 is not met, the services program proceeds to decision block 568 to determine whether the requested function corresponds to CONVERT JULIAN TO GREGORIAN AND GREGORIAN TO JULIAN function in block 570. The CONVERT JULIAN TO GREGORIAN AND GREGORIAN TO JULIAN function ("CON.100") performs one of the following functions:

1) If (KQDTS)-IN-DATE is in Gregorian format, the services program converts the date to Julian format;
2) If (KQDTS)-IN-DATE is in Julian format, the services program converts the date to Gregorian format; or
3) If (KQDTS)-IN-DATE is in EIBDATE format, the services program converts the date to Gregorian format based on the pivot year.

EIBDATE format comprises a "day" value between 1 and 365/366 inclusive, based on a leap year check, a 2-digit year value, and a "century" value of '0' or '1' relative to the pivot year. Using a pivot year of 1968, for example, a "century" value of '0' represents the 20th century (the 1900's), whereas a "century" value of '1' represents the 21st century (the 2000's).

If the condition in decision block 568 is not met, the services program proceeds to decision block 572 to determine whether the requested function corresponds to DAY OF WEEK function in block 574. The DAY OF WEEK function ("DOW.100") returns an integer value between 1 and 7 inclusive corresponding to the days of the week, where '1' represents Sunday. The input date may be in Gregorian or Julian format.

If the condition in decision block 572 is not met, the services program proceeds to decision block 576 to determine whether the requested function corresponds to DATE-TIME VALIDATION function in block 578. The DATE-TIME VALIDATION function ("DTM.100") returns a 'Y' in (KQDTS)-OUT-VALIDATE FLAG when the input date and time values are valid. A valid date value is defined in the same manner as described for the DATE VALIDATION function. A valid time value is defined as an HHMMSS000 formatted value, where HH is inclusive 0 and 23, MM is between 0 and 59, and SS is between 0 and 59 inclusive.

If the condition in decision block 576 is not met, the services program proceeds to decision block 580 to determine whether the requested function corresponds to TIME VALIDATION function in block 582. The TIME VALIDATION function ("TIM.100") returns a 'Y' in (KQDTS)-OUT-VALIDATE FLAG when the input time value is valid. A valid time value is defined as an HHMMSS000 formatted value, where HH is between 0 and 24 inclusive, MM is between 0 and 59 inclusive, and SS is between 0 and 59 inclusive.

If the condition in decision block 580 is not met, the services program proceeds to decision block 584 to determine whether the requested function corresponds to LEAP YEAR CHECK function in block 586. The LEAP YEAR CHECK function ("LYR.100") validates a Gregorian or Julian input date passed by the calling program and returns a 'Y' in (KQDTS)-OUT-LEAP-YEAR-FLAG if the input date is a leap year.

If the condition in decision block 584 is not met, the services program proceeds to decision block 588 to determine whether the requested function corresponds to DAYS IN MONTH function in block 590. The DAYS IN MONTH function ("DIM.100") validates a Gregorian or Julian input date passed by a calling program and returns the number of days in the month corresponding to the input date.

If the condition in decision block 588 is not met, the services program proceeds to decision block 592 to determine whether the requested function corresponds to ADD TIME TO DATE-TIME function in block 598. The ADD TIME TO DATE-TIME function ("ADT.100") adds an input time value passed to the services program in (KQDT)-IN-TIME-FOR-CALC (a 9-digit field) to the input date and time data elements passed to the services program. The input date is passed to the services program in Gregorian or Julian format. The time units of the (KQDT)-IN-TIME-FOR-CALC value is defined by a single-character (KQDTS)-IN-TIME-FLAG-CALC data element, indicating seconds ('S'), minutes ('M'), or hours ('H').

If the condition in decision block 592 is not met, the services program proceeds to decision block 501 to determine whether the requested function corresponds to SUB-TRACT TIME FROM DATE-TIME function in block 503. The SUBTRACT TIME FROM DATE-TIME function ("SDT.100") subtracts an input time value passed to the services program in (KQDT)-IN-TIME-FOR-CALC (a 9-digit field) from the input date and time data elements passed to the services program. The input date is passed to the services program in Gregorian or Julian format. The time units of the (KQDT)-IN-TIME-FOR-CALC value are defined by a single-character (KQDTS)-IN-TIME-FLAG-CALC data element, indicating seconds ('S'), minutes ('M'), or hours ('H').

If the condition in decision block 501 is not met, the services program proceeds to decision block 505 to determine whether the requested function corresponds to DIFFERENCE BETWEEN TWO DATE-TIMES function in block 507. The DIFFERENCE BETWEEN TWO DATE-TIMES function ("DDT.100") calculates the difference between the first two input dates and times passed to the services program in the (KQDTS)-IN-DATE-TIME table. The input dates are passed to the services program in Gregorian or Julian format. The date and time values of each date-time pair are converted to a single date-time format before the difference is calculated by subtracting the lesser date-time value from the greater date-time value. The resulting (KQDTS)-OUT-DIFFERENCE-IN-DAYS is a positive integer. The non-integer portion of the difference is output in the (KQDTS)-OUT-TIME data element in HHMMSS000000 format.

Block 594 provides the opportunity to extend the functions supported by the services program, Such extended functionality may or may not make use of the FUTURE-USE data elements described herein. The services program terminates at RETURN block 596 and returns to the calling program.

Figure 6A:
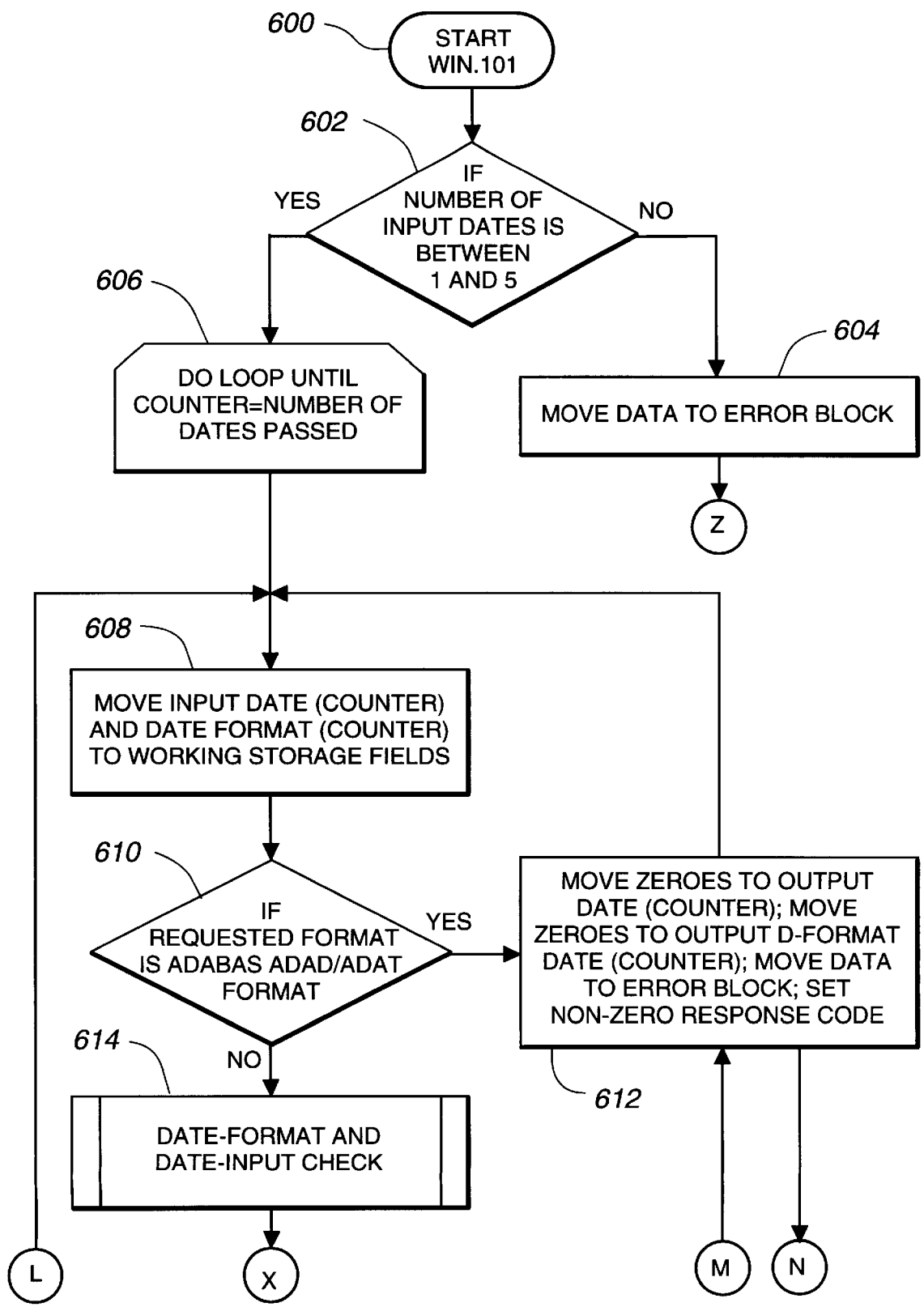
FIGS. 6A, 6B and 6C depict a flow chart describing an exemplary function ("WIN.101") in accordance with the present invention.
Figure 6B:
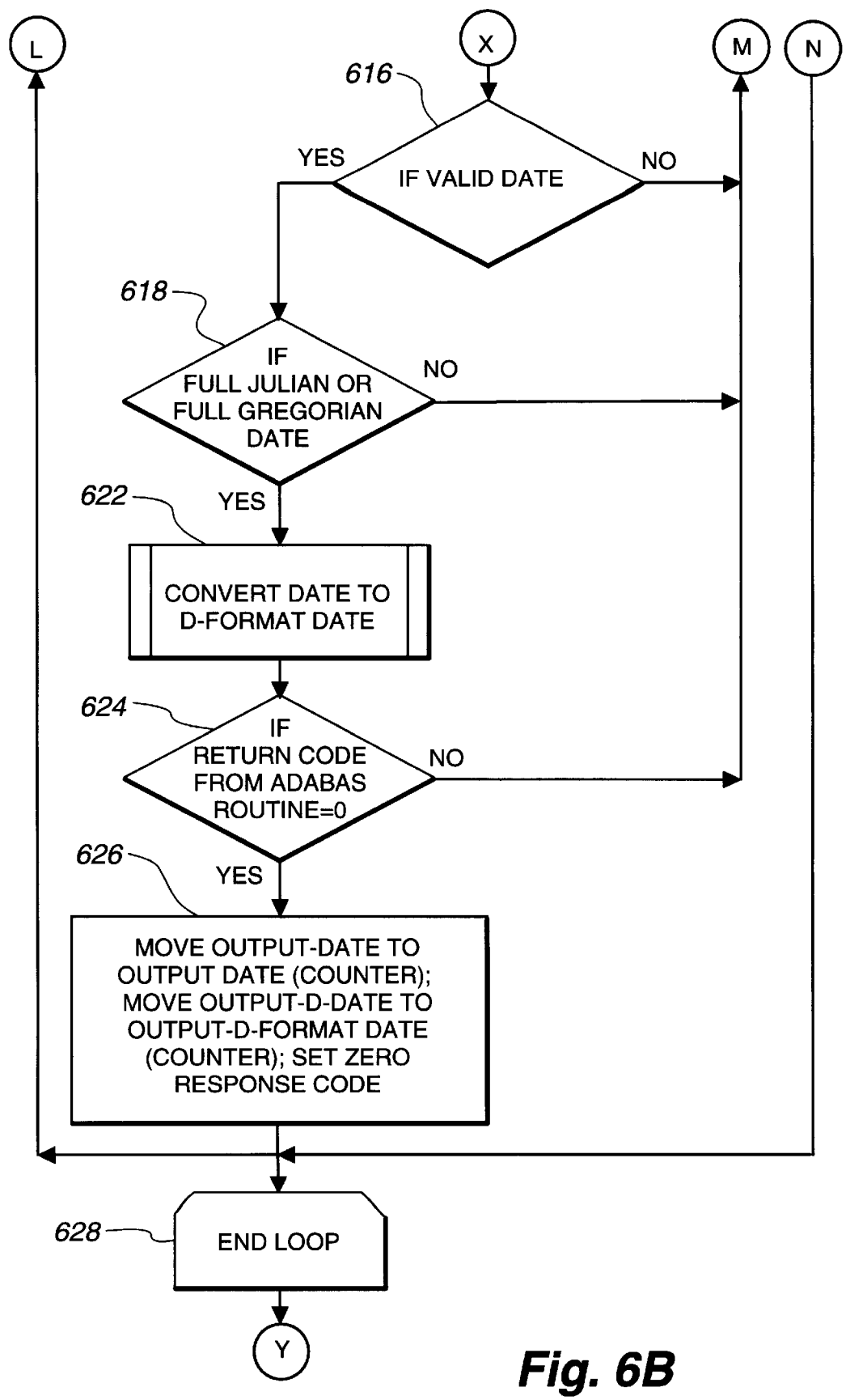
Figure 6C:
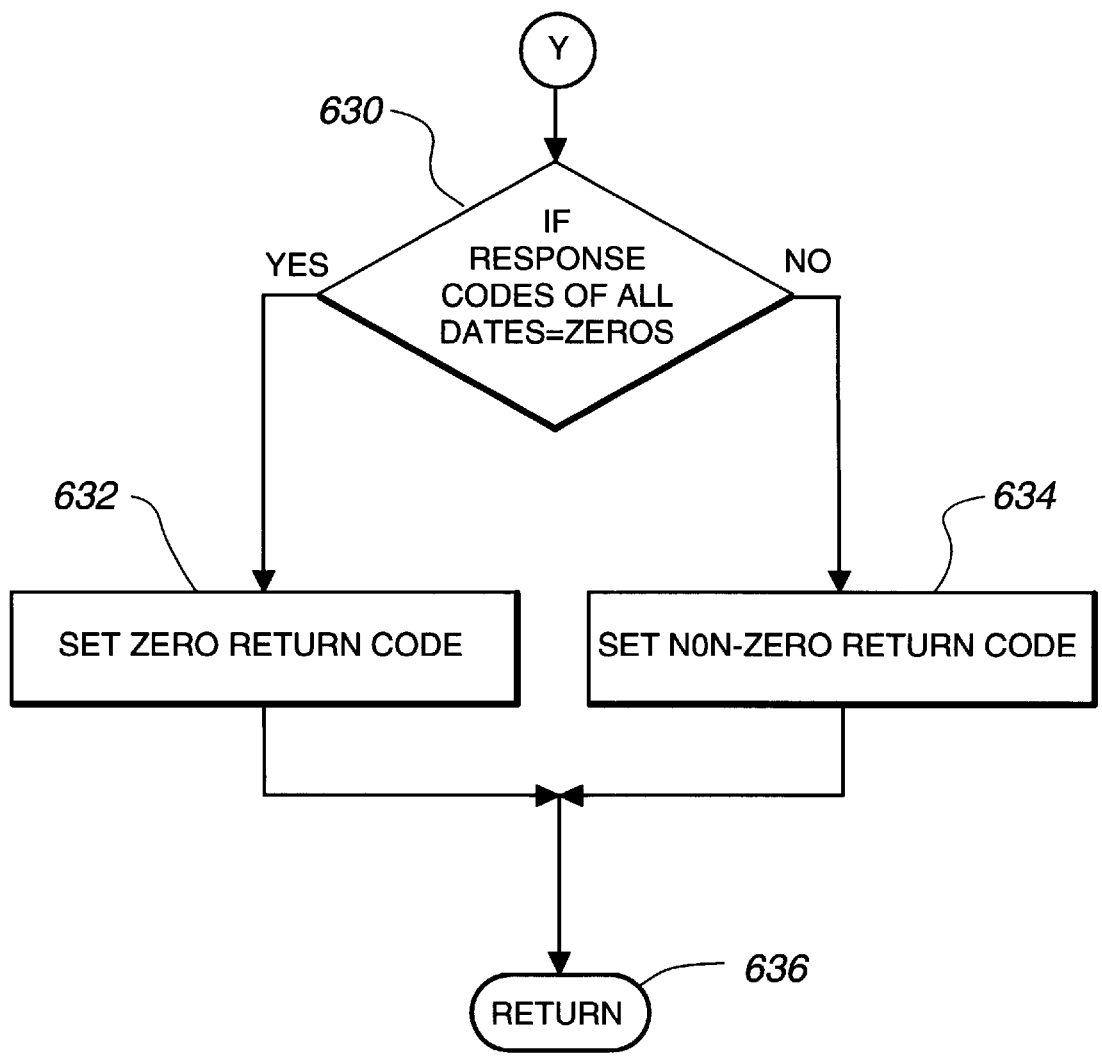

FIGS. 6A through 6C illustrate an exemplary function supported by preferred embodiment of the present invention. In block 600, the WINDOWING function "WIN.101" commences and proceeds to decision block 602, which tests the number of input dates passed by the calling program. The illustrated WINDOWING function supports up to 5 input dates, but any number of input dates may be supported in accordance with the present invention. If the number of input dates exceeds the supported number of dates (e g., 5 dates) in this illustration), then the input data is moved to the error block described in the "(R)-INFORMATION" portion of the source code listed in this specification. If a supported number of input dates is received by the WIN.101 function, the processing enters loop 606 to sequentially process each of the dates.

Block 608 moves an input date and input date format parameter corresponding to the current index in the loop to the working storage fields in the services program. If the input date format is not ADABAS D or ADABAS T format, decision block 610 directs processing to DATE-FORMAT AND DATE-INPUT CHECK block 614 to verify proper format and to validate the input date. Block 614 also performs the WINDOWING function based on the pivot year. If, however, the input date format is ADABAS D or ADABAS T format, decision block 610 directs processing to block 612 to set the output dates corresponding to the current index to zero, to move the output data to the error block, and to set a non-zero response code to indicate an exception. At completion of block 612, processing returns to block 608 after incrementing the index to process the next input date. In this fashion, the next date in the input date table is processed in each looping cycle. The same looping construct is employed after a successful input date processing operation, as shown by the arrow attached to connector "L". Such "looping" operation continues until all the dates in the input date table have been processed.

After the processing in block 614 completes, decision block 616 tests to see if a valid date resulted from the WINDOWING function in block 614 was received in the input table. If not, processing moves to block 612 for exception processing. If the resulting date is valid, processing moves to decision block 618, which tests to determine whether the resulting date was in full Julian or full Gregorian date format. If the resulting date is not in full Julian or full Gregorian format, processing proceeds to block 612 for exception processing. If the resulting date is in full Julian or full Gregorian format, processing proceeds to block 622 to convert the resulting date to ADABAS D format. Thereafter, processing proceeds to decision block 624 to test the return code from the ADABAS conversion routine. If the conversion routine returns a non-zero return code, processing proceeds to block 612 for exception processing. If the return code from the ADABAS conversion routine equals zero, processing proceeds to block 626, which moves the resulting output date to the output date data element corresponding to the input date, moves the ADABAS-formatted output date to the corresponding data element for an ADABAS-formatted output date, and sets the response code to zero. If additional dates exist in the table to be processed, processing returns to block 608 after indexing the counter to operate on the next input date. This is shown in Figures 6A and 6D by the arrow attached to connector "L". If all the input dates in the input table are processed, operation proceeds to block 628 which terminates the loop, and decision block 630 evaluates whether all of the response codes equal zero. If all of the response codes equal zero, processing proceeds to block 632 to set the return code to zero and proceeds to RETURN block 636 to terminate the function. Alternatively, if one or more of the response codes does not equal zero, processing proceeds from decision block 630 to block 634 to set a non-zero return code and proceeds to RETURN block 636 terminating the function.

Figure 7A:
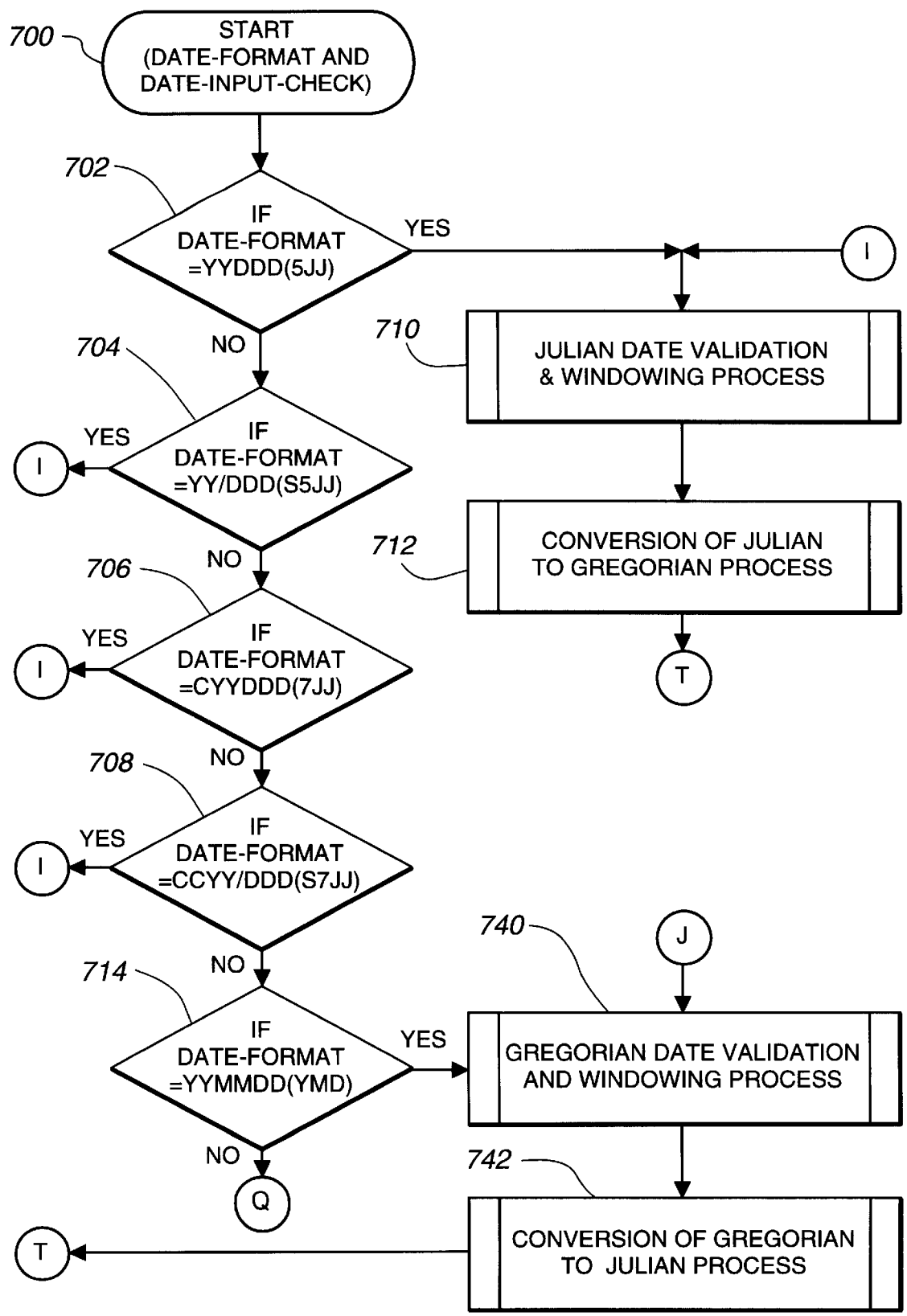
FIGS. 7A, 7B and 7C depict the DATE-FORMAT AND DATE-INPUT CHECK routine shown in block 614 of FIG. 6A.
Figure 7B:
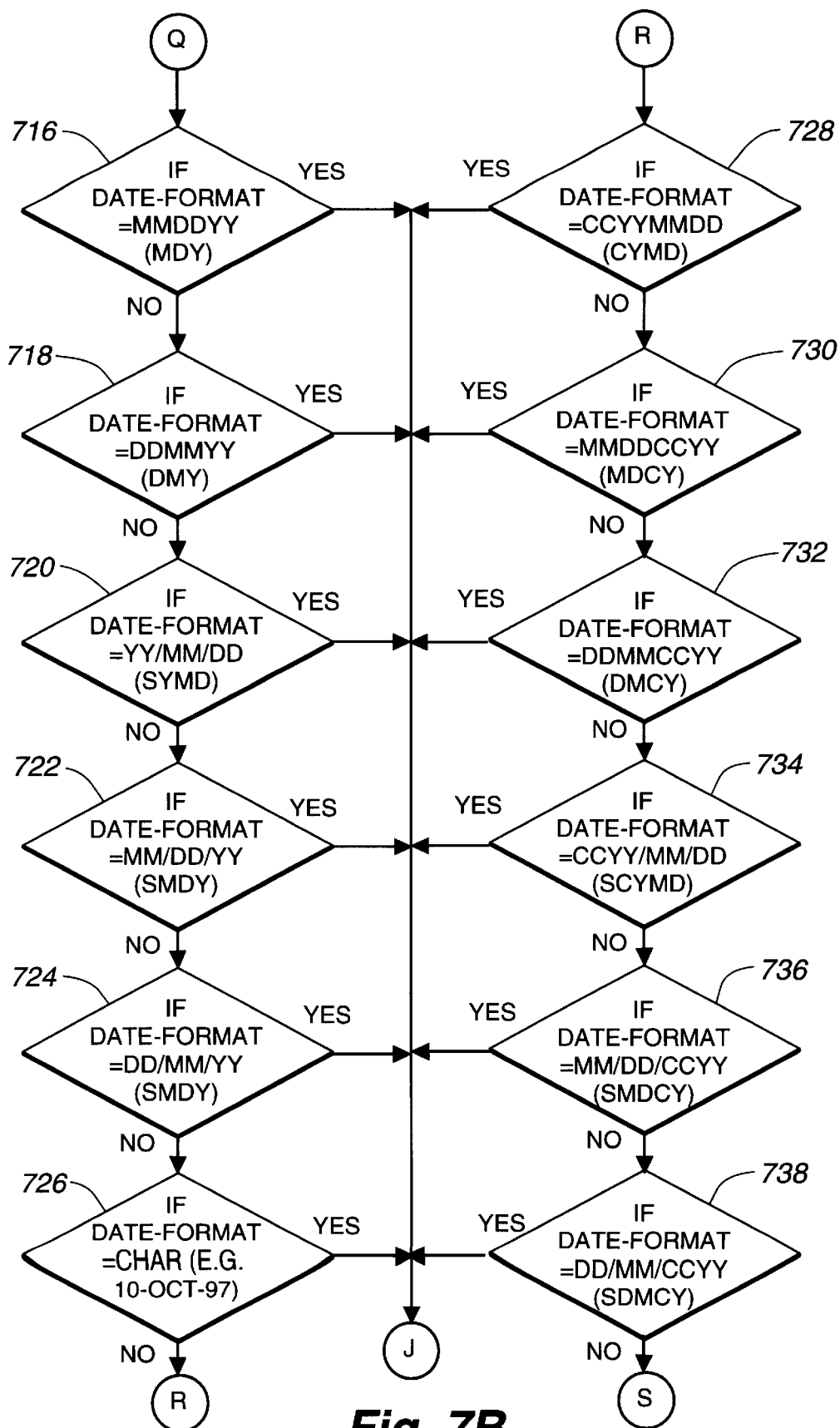
Figure 7C:
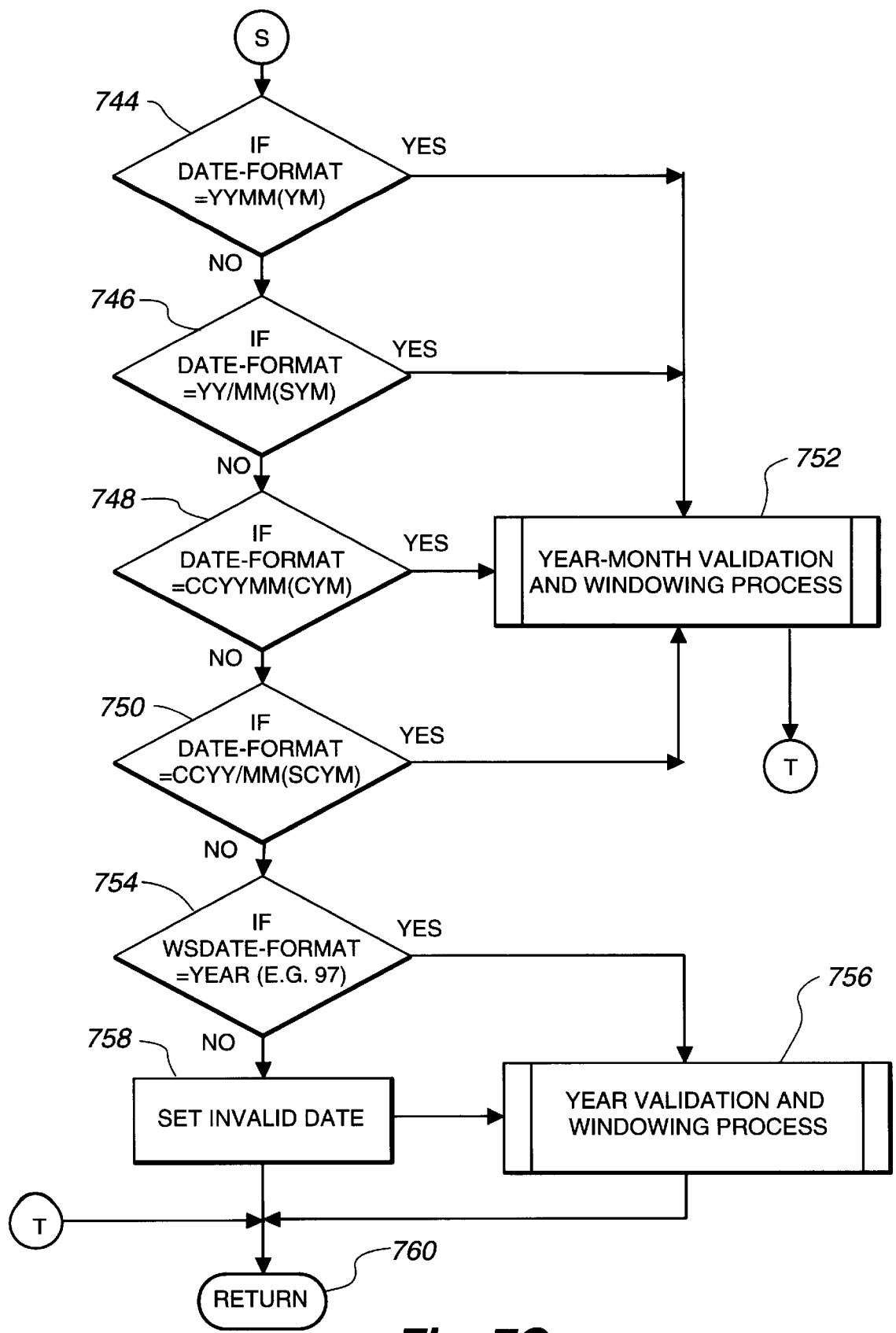

In FIGS. 7A, 7B, and 7C, the DATE-FORMAT AND DATE-INPUT CHECK subroutine is illustrated. Decision blocks 702, 704, 706, and 708 test whether the input date is in one of four Julian date formats. If so, processing proceeds to block 710 for Julian date validation and windowing. After block 710, block 712 is executed, converting the Julian date to a Gregorian date. Thereafter, processing proceeds to block 760 in FIG. 7C to terminate the process. If the input date is not in Julian format, decision blocks 714 through 738 test the input date for one of 13 different Gregorian date formats. If the input date is in one of the supported Gregorian date formats, block 740 is executed to validate the date and perform the windowing process. Thereafter, block 742 converts the date from Gregorian format to Julian format and proceeds to block 760 to terminate the process.

If the input date is in neither a supported Julian or a supported Gregorian format, decision blocks 744 through 750 evaluate whether the input date is in a "year-month" format. If so, processing proceeds to block 752 to perform YEAR-MONTH VALIDATION AND WINDOWING, and then processing proceeds to RETURN block 760 to terminate the process. If the input date does not match one of the previously-tested formats, processing proceeds to decision block 754 to test for a "year" format. If the input date matches the year format, processing proceeds to block 756 for YEAR VALIDATION AND WINDOWING, and then proceeds to RETURN block 760 to terminate the process. If, however, the input date has not matched any of the supported formats, processing proceeds to block 758 to set an invalid date flag, thereafter proceeding to RETURN block 760 to terminate the process.

Figure 8:
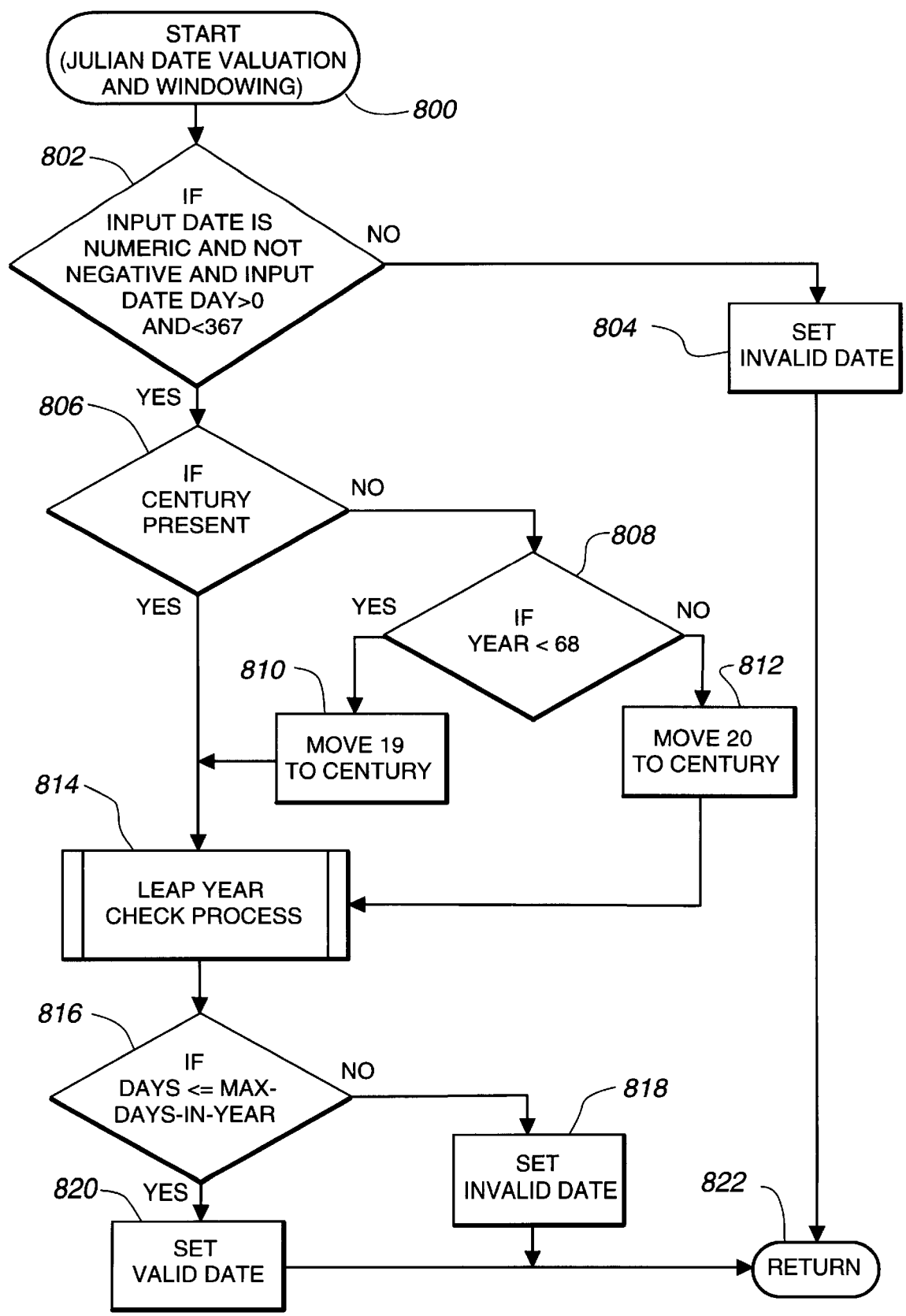
FIG. 8 illustrates a flow chart depicting the JULIAN DATE VALIDATION AND WINDOWING process shown in block 710 of FIG. 7A.

FIG. 8 illustrates the process of JULIAN DATE VALIDATION AND WINDOWING (block 710 of FIG. 7A). The process starts at block 800 and proceeds to block 802 to evaluate whether the input date is a non-negative number having a valid number of input days between zero and 367 exclusive. If not, processing proceeds to block 804, which sets an invalid date flag and returns to RETURN block 822. If the input date is validated, processing proceeds to decision block 806 to determine whether a century value is present. If not, processing proceeds to decision block 808 to compare the input date's year to a pivot year ("68" in a preferred embodiment of the present invention). If the input year is not less than the pivot year, processing proceeds to block 810 to assign a first century value ("19" in a preferred embodiment). If the input year is less than the pivot year, processing proceeds to block 812 to assign a second century value ("20" in a preferred embodiment). Note that the century values of "19" and "20" are used in this illustration, but any numerically adjacent century values may be used as appropriate. At the completion of blocks 810 and 812, processing proceeds to block 814 to check for a leap year. Thereafter, processing proceeds to decision block 816 to determine whether the number of days in the windowed year exceeds the maximum days in the particular century and year. If the input days exceed the valid number of days in the year, processing proceeds to block 818 to set an invalid date flag and proceeds to RETURN block 822 to terminate the process. Otherwise, a valid date flag is set in block 820, and the process proceeds to RETURN block 822 to terminate.

Figure 9:
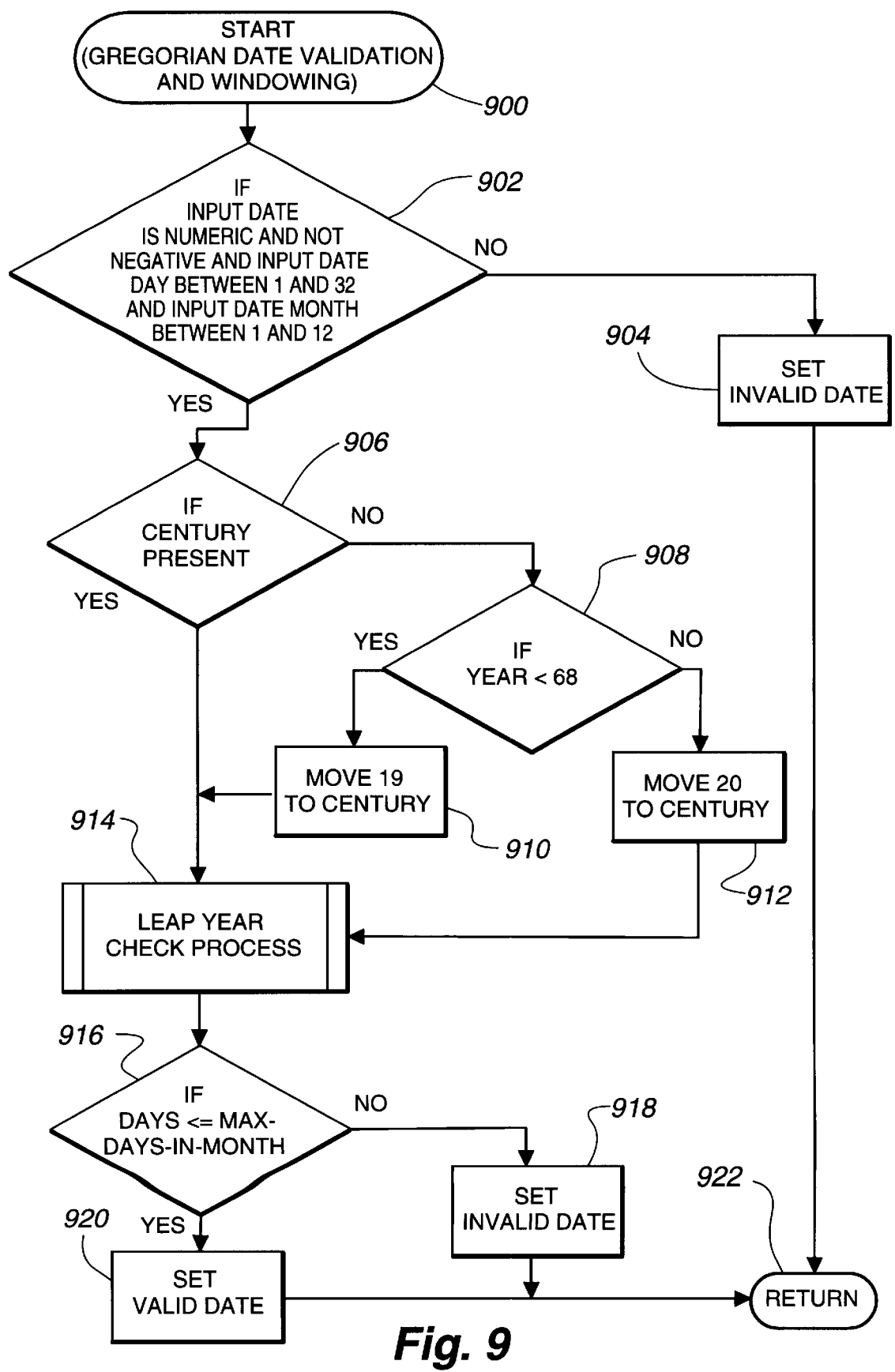
FIG. 9 illustrates a flow chart depicting the GREGORIAN DATE VALIDATION AND WINDOWING process shown in block 740 of FIG. 7A.

FIG. 9 illustrates the process of GREGORIAN DATE VALIDATION AND WINDOWING (block 740 of FIG. 7A). The process starts at block 900 and proceeds to block 902 to evaluate whether the input date is a non-negative number having a valid number of input days between 1 and 31 inclusive and a valid number input months between 1 and 12 inclusive. If not, processing proceeds to block 904, which sets an invalid date flag and returns to RETURN block 922. If the input date is validated, processing proceeds to decision block 906 to determine whether a century value is present. If not, processing proceeds to decision block 908 to compare the input date's year to a pivot year ("68" in a preferred embodiment of the present invention). If the input year is not less than the pivot year, processing proceeds to block 910 to assign a first century value ("19" in a preferred embodiment). If the input year is less than the pivot year, processing proceeds to block 912 to assign a second century value ("20" in a preferred embodiment). Note that the century values of "19" and "20" are used in this illustration, but any numerically adjacent century values may be used as appropriate. At the completion of blocks 910 and 912, processing proceeds to block 914 to check for a leap year. Thereafter, processing proceeds to decision block 916 to determine whether the number of days in the windowed year exceeds the maximum days in the particular century and year. If the input days exceed the valid number of days in the year, processing proceeds to block 918 to set an invalid date flag and proceeds to RETURN block 922 to terminate the process. Otherwise, a valid date flag is set in block 920, and the process proceeds to RETURN block 922 to terminate.

Figure 10:
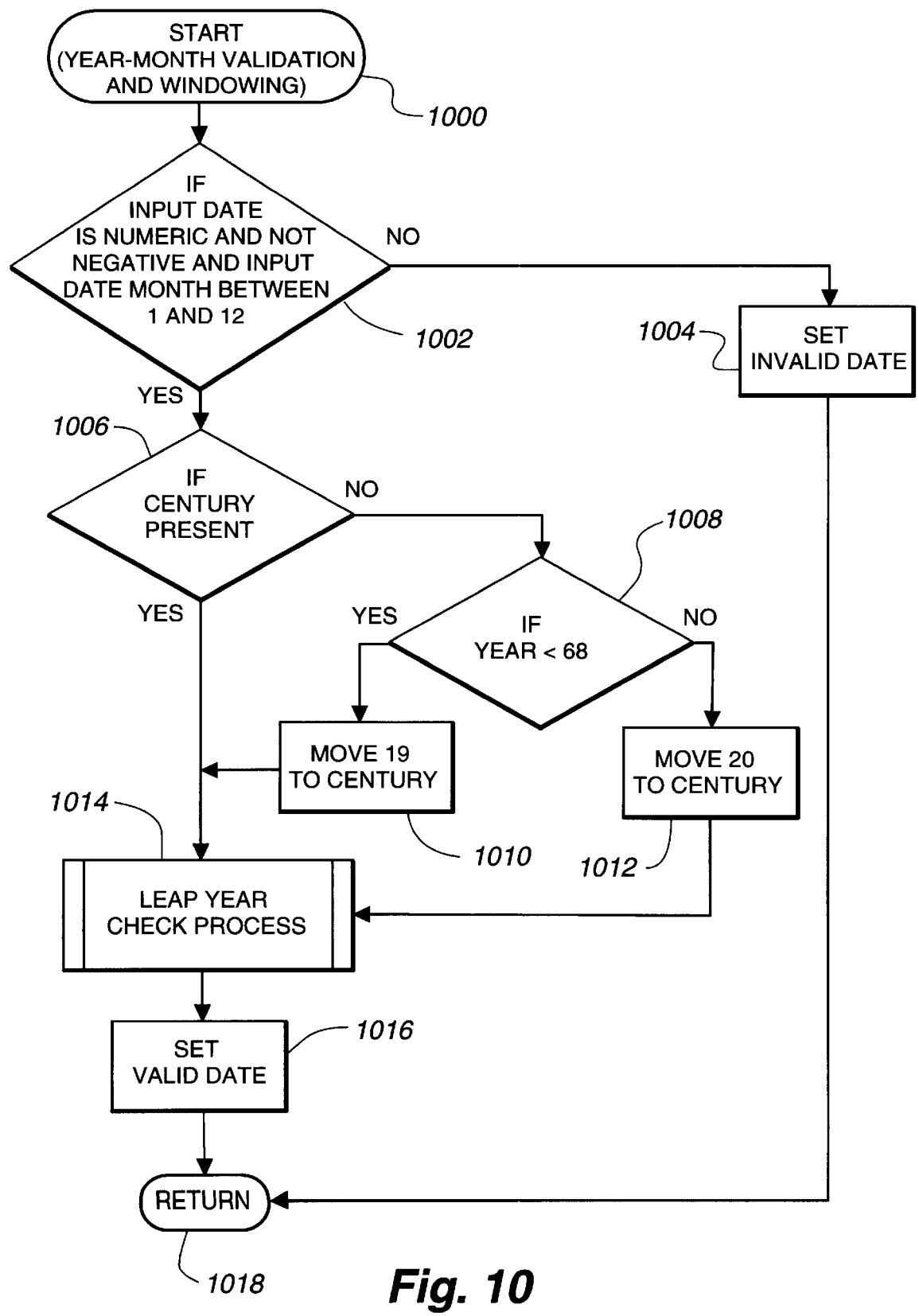
FIG. 10 illustrates a flow chart depicting the YEAR-MONTH DATE VALIDATION AND WINDOWING process shown in block 752 of FIG. 7C.

FIG. 10 illustrates the process of YEAR-MONTH VALIDATION AND WINDOWING (block 752 of FIG. 7C). The process starts at block 1000 and proceeds to block 1002 to evaluate whether the input date is a non-negative number having a valid number input months between 1 and 12 inclusive. If not, processing proceeds to block 1004, which sets an invalid date flag and returns to RETURN block 1018. If the input date is validated, processing proceeds to decision block 1006 to determine whether a century value is present. If not, processing proceeds to decision block 1008 to compare the input date's year to a pivot year ("68" in a preferred embodiment of the present invention). If the input year is not less than the pivot year, processing proceeds to block 1010 to assign a first century value ("19" in a preferred embodiment). If the input year is less than the pivot year, processing proceeds to block 1012 to assign a second century value ("20" in a preferred embodiment). Note that the century values of "19" and "20" are used in this illustration, but any numerically adjacent century values may be used as appropriate. At the completion of blocks 1010 and 1012, processing proceeds to block 1014 to check for a leap year. Processing then proceeds to block 1016 to set a valid date flag and to RETURN block 1018 for termination.

Figure 11:
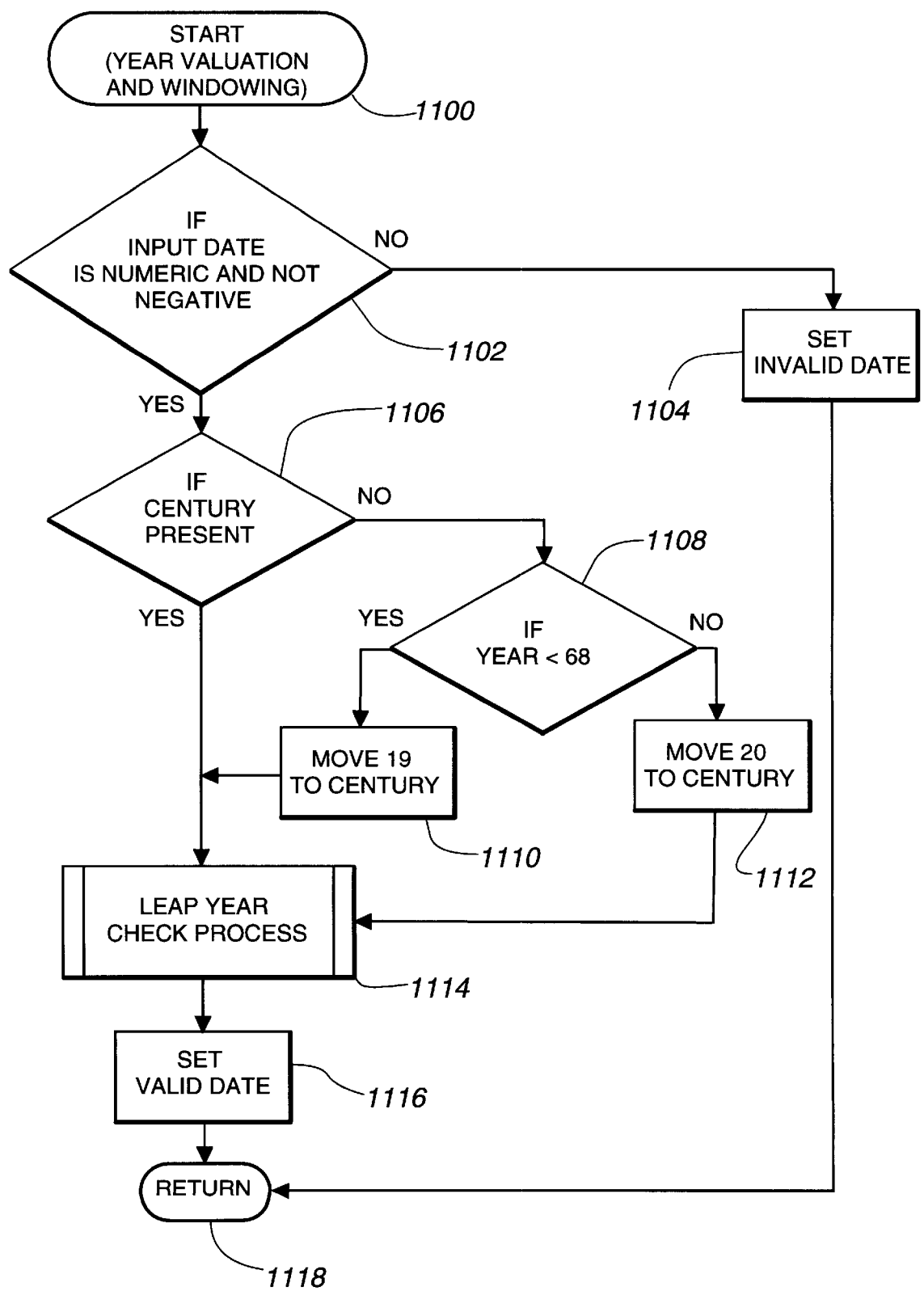
FIG. 11 illustrates a flow chart depicting the YEAR DATE VALIDATION AND WINDOWING shown in block 756 of FIG. 7C.

FIG. 11 illustrates the process of YEAR VALIDATION AND WINDOWING (block 756 of FIG. 7C). The process starts at block 1100 and proceeds to block 1102 to evaluate whether the input date is numeric and non-negative. If not, processing proceeds to block 1104, which sets an invalid date flag and returns to RETURN block 1118. If the input date is validated, processing proceeds to decision block 1106 to determine whether a century value is present. If not, processing proceeds to decision block 1108 to compare the input date's year to a pivot year ("68" in a preferred embodiment of the present invention). If the input year is not less than the pivot year, processing proceeds to block 1110 to assign a first century value ("19" in a preferred embodiment). If the input year is less than the pivot year, processing proceeds to block 1112 to assign a second century value ("20" in a preferred embodiment). Note that the century values of "19" and "20" are used in this illustration, but any numerically adjacent century values may be used as appropriate. At the completion of blocks 1110 and 1112, processing proceeds to block 1114 to check for a leap year. Processing then proceeds to block 1116 to set a valid date flag and to RETURN block 1118 for termination.

Figure 12:
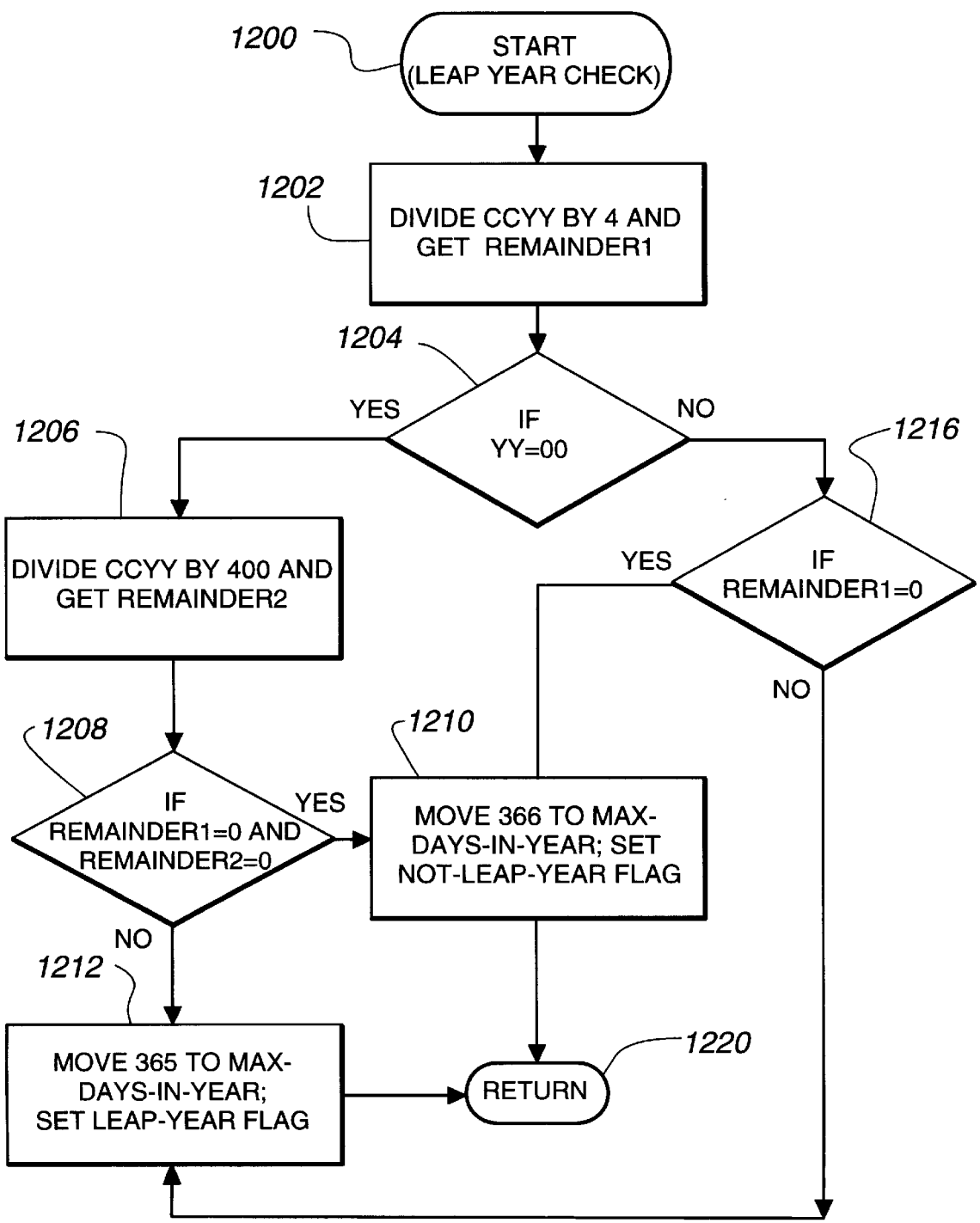
FIG. 12 illustrates a flow chart depicting the LEAP YEAR CHECK process shown in block 814 of FIG. 8, block 914 of FIG. 9, block 1014 of FIG. 10, and block 1114 of FIG. 11.

FIG. 12 illustrates the LEAP YEAR CHECK process (blocks 814 in FIG. 8, 914 in FIG. 9, 1014 in FIG. 10, and 1114 and FIG. 11) starting with block 1200, which receives an input date having a 2-digit year value and a 2-digit century value. Processing then proceeds to block 1202, which combines the century and year values and divides the combined century-year value by four, yielding a first remainder value (REMAINDER1). In decision block 1204, if the year value equals zero, processing proceeds to block 1206 to divide the combined century-year value by 400, yielding a second remainder value (REMAINDER2). In block 1208, if REMAINDER1 equal zero and REMAINDER2 equals zero, processing proceeds to block 1210, which moves the Value "366" to a data element holding the maximum number of days in a year and sets a flag indicating that the combined century-year value is a leap year. If block 1208 determines that either REMAINDER1 or REMAINDER2 does not equal zero, processing proceeds to block 1212, which moves the value "365" to a data element holding the maximum days in the year and sets a flag indicating that the year is not a leap year. In decision block 1216, if REMAINDER1 equals zero, processing proceeds to block 1210 to indicate that the year is a leap year. Also, from decision block 1216, if REMAINDER1 does not equal zero, processing proceeds to block 1212 to indicate the year is not a leap year. At the completion of blocks 1210 and 1212, processing proceeds to RETURN block 1220 to terminate.

Other functions in a preferred embodiment relate to date/time functions and multiple time zones. Similar to CURRENT DATE-TIME function ("CUR.100"), which returns the current date and time based on a CICS ASK-TIME call for on-line calling programs or a COBOL ACCEPT call for batch calling programs, the TZ CURRENT DATE-TIME function determines the current data and time applicable in a target time zone. Input parameters representing the current time zone and the target time zone are provided by the calling program. Alternatively, the current time zone parameter can be determined automatically, such as through an operating system call. The TZ CURRENT DATE-TIME function determines the current date and time in the current time zone and adjusts them by an appropriate number of hours according to the target time zone. The adjustment may alter both current date and time values in the target time zone. Time zones may be specified by a time zone code, a country code, a city code, or some other parameter. Moreover, any function using a current date and time can populate a resulting time zone output parameter to specify the proper time zone for the result.

Likewise, the CURRENT TIME ZONE function accepts input parameters indicating the current time zone and a positive or negative number of hours, which represents a time zone adjustment between the current time zone and a resulting time zone. The function returns a resulting time zone code for the time zone that corresponds the time zone adjustment. For example, if a time zone code for Eastern Standard Time (EST) and an adjustment value of '−2' are input to the CURRENT TIME ZONE function, the resulting time zone code for Mountain Standard Time (MST) is returned. Another function, DIFF TIME ZONES, accepts a first time zone parameter and a second time zone parameter and calculates the difference in hours between the two time zones. This function is useful when calculating corresponding date and time values in different time zones.

The time zone functions are also incorporated into various date and time arithmetic functions. For example, TZ SUBTRACT TIME FROM DATE-TIME function performs date and time subtraction in a manner similar to the SUBTRACT TIME FROM DATE-TIME function and adjusts the number of hours corresponding to the target time zone and current time zone parameters. Other date and time functions may be combined with the time zone functionality in the same manner, including adding dates and times, windowing, and format conversions. Also, as mention previously, any function using a current date and time can populate a resulting time zone output parameter to specify the proper time zone for the result.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Moreover, while there have been described herein the principles of the present invention in conjunction with a specific COBOL data configuration, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for performing operations on a plurality of date/time input data elements resulting in a plurality of date/time output data elements, comprising the steps of:

providing a date/time services program that includes a plurality of date/time formats in a single call;

receiving said plurality of date/time input data elements via a call to said date/time services program, the date/time input data elements received in the call having a plurality of different input formats;

selecting one of said plurality of date/time input data elements;

selecting one of said plurality of different input formats relating to the selected date/time input data element;

selecting one of said plurality of date/time output data elements associated with said selected data time input data element;

performing a date/time function on said selected date/time input data element to produce a function result;

converting said function result into at least one of an ADABAS T and an ADABAS D format;

loading said converted function result into said selected date/time output data element;

repeating said selecting steps, said performing step, and said loading step until all of said plurality of date/time input data elements have been selected; and outputting said plurality of date/time output data elements from said date/time services program.

2. The method of claim 1 further comprising the step of providing a date/time element representing a date value.

3. The method of claim 1 further comprising the step of providing a date/time element representing a time value.

4. The method of claim 1 wherein the step of performing a date/time function comprises the steps of:

performing a first date/time function on said selected date/time input data element to produce an intermediate result; and performing a second date/time function on said intermediate result to produce said function result.

5. The method of claim 4 wherein the step of performing a first date/time function comprises the step of performing a windowing function.

6. The method of claim 5 wherein the step of performing a second date/time function comprises the step of performing a non-windowing function.

7. The method of claim 1 further comprising the steps of:

providing a plurality of date/time function requests in a single call of the date/time services program; and selecting one of said plurality of date/time functions associated with said selected date/time input data element.

8. The method of claim 7 wherein the step of performing a date/time function comprises the step of performing said selected date/time function to produce said function result.

9. The method of claim 1 wherein the step of performing a date/time function further comprises the step of validating said selected date/time input data element against said selected date/time input format.

10. The method of claim 1 further comprising the steps of:

providing a plurality of date/time output format in a single call of said services program; and selecting one of said plurality of date/time output formats associated with said selected date/time input data element.

11. The method of claim 10 wherein the step of loading said function result into said selected date/time output data element comprises the step of converting said function result into said selected date/time output format.

12. The method of claim 1 wherein the step of performing a date/time function comprises the step of performing a "Year 2000"-compliant operation on said selected date/time input data element to produce said function result.

13. The method of claim 1 further comprising the steps of:

providing a program version parameter to said date/time services program;

receiving a version control parameter to said date/time services program;

comparing said version control parameter with said program version parameter; and outputting an error condition from said date/time services program, responsive to said comparing step, if said version control parameter fails to match said program version parameter.

14. The method of claim 1 further comprising the steps of:

providing a plurality of program version parameters to said date/time services program; each program version parameter being associated with a different version of services program functionality;

receiving a version control parameter to said date/time services program;

comparing said version control parameter with one of said plurality of program version parameters; and executing services program functionality associated with said one of said plurality of program version parameters, responsive to said comparing step, if said one of said plurality of program version parameters matches said version control parameter.

15. A program storage medium, readable by a computer, tangibly embodying a program of instructions executable by said computer for performing operations on a plurality of date/time input data elements resulting in a plurality of date/time output data elements, the program comprising instructions for:

receiving said plurality of date/time input data elements via a call from a calling program that includes a plurality of date/time formats in a single call, the date/time input data elements received in the call having a plurality of different input formats;

selecting one of said plurality of date/time input data elements;

selecting one of said plurality of different input formats relating to the selected date/time input data element, the plurality of different input formats comprising Julian and Gregorian formats;

selecting one of said plurality of date/time output data elements associated with said selected date time input data element;

performing a date/time function on said selected date/time input data element to produce a function result;

loading said function result into said selected date/time output data element;

repeating said selecting steps, said performing step, and said loading step until all of said plurality of date/time input data elements have been selected; and outputting said plurality of date/time output data elements to said calling program.

16. A system for performing operations on a plurality of date/time data elements resulting in a plurality of date/time output data elements, said system comprising:

a computer processor;

a non-volatile storage medium storing a database coupled to said computer processor;

memory storing a date/time services program that includes a plurality of date/time formats in a single call having defined memory structures for storing said plurality of date/time input data structures and said plurality of date/time output data structures;

an application program in said memory that accesses said database and invokes execution of said date/time services program to perform a date/time function on each of said plurality of date/time input data elements, the date/time elements having a plurality of different input formats comprising Julian and Gregorian formats, to produce corresponding function result values; said services program loading said corresponding result values into said plurality of date/time output data elements and outputting said plurality of date/time output data elements to said application program.

17. Apparatus for performing operations on a plurality of date/time input data elements resulting in a plurality of date/time output data elements, comprising:

means for receiving said plurality of date/time input data elements via a single call from a calling program that includes a plurality of date/time formats in a single call, the date/time input data elements received in the single call having a plurality of different formats comprising Julian and Gregorian formats;

means for performing a first date/time function on a first one of said plurality of date/time input data elements to produce a first function result;

means for performing a second date/time function on a second one of said plurality of date/time input data elements to produce a second function result;

means for loading said first and second function results into said plurality of date/time output data elements; and outputting said plurality of date/time output data elements to said calling program.

18. A computer program for executing a computer process, said computer program being readable from a storage medium by a computing system and encoding a program of instructions for performing operations on a plurality of date/time input data elements resulting in a plurality of date/time output data elements, said computer process comprising the steps of:

receiving said plurality of date/time input data elements via a call from a calling program that includes a plurality of date/time formats in a single call, the date/time input data elements received in the call having a plurality of different formats comprising Julian and Gregorian formats;

selecting one of said plurality of date/time input data elements;

selecting one of said plurality of different input formats relating to the selected date/time input data element;

selecting one of said plurality of date/time output data elements associated with said selected date/time input data element;

performing a date/time function on said selected date/time input data element to produce a function result;

loading said function result into said selected date/time output data element;

repeating said selecting steps, said performing step, and said loading step until all of said plurality of date/time input data elements have been selected; and outputting said plurality of date/time output data elements from said calling program.

19. A method for determining a plurality of century data elements corresponding to a plurality of date representations, each date representation having an input year value that lacks a century designation, said method comprising the steps of:

receiving said plurality of date representations via a call from a calling program that includes a plurality of date/time formats in a single call, the date representations received in the call having a plurality of different formats comprising Julian and Gregorian formats;

selecting one of said plurality of date representations;

selecting one of said plurality of century data elements corresponding to said selected date representation;

comparing said input year value of said selected date representation to a pivot year value;

assigning a first century value to said selected century data element, responsive to said comparing step, if said input year value is greater than or equal to said pivot year value;

assigning a second century value to said selected century data element, responsive to said comparing step, if said input year value is less than said pivot year value, said second century value equaling said first century value plus one year;

repeating said selecting steps, said comparing step, and said assigning steps, until all of said plurality of date representations have been selected; and outputting said plurality of century data elements to said calling program.

20. A program storage medium, readable by a computer, tangibly embodying a program of instructions executable by said computer for determining a plurality of city data elements corresponding to a plurality of date representations, each date representation having an input year value that lacks a century designation, the program comprising instructions for:

receiving said plurality of date representations via a call from a calling program that includes a plurality of date/time formats in a single call, the date representations received in the call having a plurality of different formats comprising Julian and Gregorian formats;

selecting one of said plurality of date representations;

selecting one of said plurality of century data elements corresponding to said selected date representation;

comparing said input year value of said selected date representation to a pivot year value;

assigning a first century value to said selected century data element, responsive to said comparing step, if said input year value is greater than or equal to said pivot year value;

assigning a second century value to said selected century data element, responsive to said comparing step, if said input year value is less than said pivot year value, said second century value equaling said first century value plus one year;

repeating said selecting steps, said comparing step, and said assigning steps, until all of said plurality of date representations have been selected; and outputting said plurality of century data elements to said calling program.

21. A computer program for executing a computer process, said computer program being readable from a storage medium by a computing system and encoding a program of instructions for determining a plurality of century data elements corresponding to a plurality of date representations, each date representation having an input year value that lacks a century designation, said computer process comprising the steps of:

receiving said plurality of date representations via a call from a calling program that includes a plurality of date/time formats in a single call, the date representations received in the call having a plurality of different formats comprising Julian and Gregorian formats;

selecting one of said plurality of date representations;

selecting one of said plurality of century data elements corresponding to said selected date representation;

comparing said input year value of said selected date representation to a pivot year value;

assigning a first century value to said selected century data element, responsive to said comparing step, if said input year value is greater than or equal to said pivot year value;

assigning a second century value to said selected century data element, responsive to said comparing step, if said input year value is less than said pivot year value, said second century value equaling said first century value plus one year;

repeating said selecting steps, said comparing step, and said assigning steps, until all of said plurality of date representations have been selected; and outputting said plurality of century data elements to said calling program.

22. A method for performing an operation on a date/time input data element resulting in a date/time output data element, comprising the steps of:

providing a date/time services program;

receiving a call to invoke said date/time services program;

receiving said date/time input data element having a first one of a plurality of formats at said date/time services program, the plurality of formats comprising at least one of Julian, Gregorian and EIBDATE formats;

performing a date/time function on said date/time input data element within said date/time services program to produce a date/time output data element having a second one of the plurality of formats, the second format being different from the first format; and outputting said date/time output data element from said date/time services program.

23. A program storage medium, readable by a computer, tangibly embodying a program of instructions executable by said computer for performing an operation on a date/time input data element resulting in a date/time output data element, the program comprising instructions for:

receiving said date/time input data element having a first one of a plurality of formats via a call from a calling program, the plurality of formats comprising at least one of Gregorian, Julian and EIBDATE formats;

performing a date/time function on said date/time input data element within said program of instructions to produce a date/time output data element having a second one of the plurality of formats, the second format being different from the first format; and outputting said date/time output data element to said calling program.

24. A computer program for executing a computer process, said computer program being readable from a storage medium by a computing system and encoding a program of instructions for performing an operation on a date/time input data element resulting in a date/time output data element, said computer process comprising the steps of:

receiving said date/time input data element having a first one of a plurality of formats via a call from a calling program, the plurality of formats comprising at least one of Gregorian, Julian and EIBDATE formats;

performing a date/time function on said date/time input data element within said computer program to produce a date/time output data element having a second one of the plurality of formats, the second format being different from the first format; and outputting said date/time output data element to said calling program.

25. A program storage medium, readable by a computer, tangibly embodying a program of instructions executable by said computer for performing operations on a plurality of date/time input data elements resulting in a plurality of date/time output data elements, the program comprising instructions for:

invoking a date/time services program via a call from the program that includes a plurality of date/time formats in a single call;

inputting said plurality of date/time input data elements via said call to said date/time services program, the date/time input data elements received in the call having a plurality of different input formats;

selecting one of said plurality of date/time input data elements;

selecting one of said plurality of different input formats relating to the selected date/time input data element, the plurality of formats comprising at least one of Gregorian, Julian and EIBDATE formats;

selecting one of said plurality of date/time output data elements associated with said selected date/time input data element;

performing a date/time function on said selected date/time input data element to produce a function result;

converting said function result into at least one of Gregorian, Julian, ADABAS D and ADABAS T formats;

loading said converted function result into said selected date/time output data element;

repeating said selecting steps, said performing step, and said loading step until all of said plurality of date/time input data elements have been selected; and receiving said plurality of date/time output data elements from said date/time services program.

26. The program storage medium of claim 25 wherein said step of performing a date/time function comprises the step of calculating said function result based on differences in specified time zones.

* * * * *